US007203365B2

(12) United States Patent
Dresevic et al.

(10) Patent No.: US 7,203,365 B2
(45) Date of Patent: Apr. 10, 2007

(54) INFORMATION STORAGE USING TABLES AND SCOPE INDICES

(75) Inventors: Bodin Dresevic, Bellevue, WA (US);
Rudolph Balaz, Redmond, WA (US);
Donald D. Karlov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 169 days.

(21) Appl. No.: 10/993,356

(22) Filed: Nov. 22, 2004

(65) Prior Publication Data

US 2005/0102055 A1 May 12, 2005

Related U.S. Application Data

(63) Continuation of application No. 09/870,478, filed on Jun. 1, 2001, now Pat. No. 6,956,970.

(60) Provisional application No. 60/212,825, filed on Jun. 21, 2000.

(51) Int. Cl.
*G06K 9/00* (2006.01)
*G06K 9/22* (2006.01)

(52) U.S. Cl. ...................... 382/189; 382/315
(58) Field of Classification Search ........ 382/187–189, 382/315; 715/541
See application file for complete search history.

(56) References Cited

U.S. PATENT DOCUMENTS

| 4,156,237 | A | 5/1979 | Okata et al. |
| 5,146,552 | A | 9/1992 | Cassorla et al. |
| 5,509,663 | A | 4/1996 | Otake et al. |
| 5,818,456 | A | 10/1998 | Cosman et al. |
| 5,893,126 | A | 4/1999 | Drews et al. |
| 6,201,528 | B1 | 3/2001 | Lucas et al. |
| 6,373,490 | B1 * | 4/2002 | Bendiksen et al. ......... 345/441 |
| 6,549,675 | B2 * | 4/2003 | Chatterjee .................. 382/244 |
| 6,563,503 | B1 * | 5/2003 | Comair et al. .............. 345/473 |
| 2002/0013795 | A1 * | 1/2002 | Dresevie et al. ............ 707/541 |

FOREIGN PATENT DOCUMENTS

| EP | 1 016 983 A2 | 7/2000 |
| WO | WO 97/22109 | 6/1997 |

OTHER PUBLICATIONS

Bill N. Schilit et al., "Digital Library Information Appliances", pp. 217-225, 1998.
Graphics Interchange Format (sm), Version 89a, 1990, CompuServe Incorporated.

(Continued)

*Primary Examiner*—Matthew C. Bella
*Assistant Examiner*—Utpal Shah
(74) *Attorney, Agent, or Firm*—Banner & Witcoff, Ltd.

(57) ABSTRACT

The present invention relates to storing information including electronic ink. Ink is stored in a data structure that permits later retrieval by applications. The ink includes stroke information and property information. Properties may be defined specifically for some strokes or may be stored in a tablet and referenced by one or more indices. Using tables and indices helps minimize the size of the data structure used to store the information.

10 Claims, 22 Drawing Sheets

OTHER PUBLICATIONS

JOT—A Specification for Ink Storage and Interchange Format, 1996.

Aref et al., "The Handwritten Trie: Indexing Electronic Ink," SIGMOD '95, 1995, pp. 151-162.

Aref et al., "On Handling Electronic Ink", ACM Computing Surveys, vol. 27, No. 4, Dec. 1995, pp. 564-567.

Uchihashi et al., "Automatic Index Creation for Handwritten Notes," IEEE Int. Conf. On Acoustics, Speech, and Signal Processing, vol. 6, Mar. 15, 1999, pp. 3453-3456.

European Search Report dated Jul. 8, 2004.

James D. Foley et al., "Computer Graphics: Principles and Practices", $2^{nd}$ Edition, pp. 835-840, 1990.

Gerald E. Farin, "Curves and Surfaces for Computer Aided Geometric Design a Practical Guide", $2^{nd}$ Edition, pp. 37-41, 1990.

Angelfire Webpage, "Curve Fitting and the Method of Least Squares", http://www.angelfire.com/ak4/neurope/Is.html, printed Jul. 6, 2001, 13 pages.

John D. Hobby, "Rasterizing Curves of Constant Width", Journal of the Association for Computing Machinery, vol. 36, No. 2, pp. 209-229, Apr. 1989.

* cited by examiner

INFORMATION STORAGE USING TABLES AND SCOPE INDICES

CROSS-REFERENCE TO RELATED APPLICATIONS

This application is a continuation application of U.S. Ser. No. 09/870,478 filed Jun. 1, 2001 now U.S. Pat. No. 6,956,970 and related to U.S. Application No. 60/212,825, entitled "Methods for Classifying, Anchoring, and Transforming Ink Annotations", filed Jun. 21, 2000, to U.S. application Ser. No. 09/750,288, entitled "Classifying, Anchoring, and Transforming Ink", filed Dec. 29, 2000, and to U.S. application Ser. No. 09/852,799 (BW 03797.00132), entitled "Serial Storage of Ink and Its Properties", filed May 11, 2001, each of whose contents are expressly incorporated herein by reference as to their entireties.

FIELD OF THE INVENTION

Aspects of the present invention are directed generally to apparatus and methods for controlling a graphical user interface (GUI). More particularly, aspects of the present invention relate to capturing and/or storing electronic ink in an efficient manner.

BACKGROUND OF THE INVENTION

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface.

The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document on-screen because of the ability to freely make notes outside of the confines of the keyboard and mouse interface.

Some computer systems permit a user to draw on a screen. For example, the Microsoft READER application permits one to add electronic ink (also referred to herein as "ink") to a document. The system stores the ink and provides it to a user when requested. Other applications (for example, drawing applications as known in the art are associated with the Palm 3.x and 4.x and PocketPC operating systems) permit the capture and storage of drawings. These drawings include other properties associated with the ink strokes used to make up the drawings. For instance, line width and color may be stored with the ink. One goal of these systems is to replicate the look and feel of physical ink being applied to a piece of paper. However, physical ink on paper may have significant amounts of information not captured by the electronic collection of a coordinates and connecting line segments. Some of this information may include the thickness of the pen tip used (as seen through the width of the physical ink), the shape of the pen tip, the speed at which the ink was deposited, and the like.

Another problem has arisen in the storage of electronic ink. While data structures are known, the size of the data structure used to store information may become excessively large and cumbersome. An example of a data structure that permits the random storage of information is the interchange file format (IFF). While the IFF is a simple structure to compose, any data structure in IFF may be excessively large, as each separate element has to be separately defined. Redundant definitions for similar elements are repeated. So, when applied to information having properties, some information may have a first set of common properties while other information may have a second set of common properties. Accordingly, an improved system is needed for storing information with its associated properties that minimize the size of the data used to represent the desired information.

SUMMARY OF THE INVENTION

The present invention provides a flexible and efficient system, method, and data structure for receiving, storing, and rendering ink, thereby solving one or more of the problems identified with conventional devices and systems.

Aspects of the present invention are directed to an improved system, method and data structure for storing ink and its associated properties. The properties may be associated with tags or identifiers. In some aspects of the present invention, the properties may be presented in property blocks. In some embodiments, the property block will appear with the ink stroke. In other embodiments, the property block may be stored with other property blocks in a table and referenced by an index. Still in other embodiments, the property block, table or index are not stored with information defining ink when their information may be obtained in other ways (including, but not limited to, the scope property, the serial nature of the data structure, and the default property or properties).

These and other features and aspects of the invention will be apparent upon consideration of the following detailed description of the preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Figure 1:
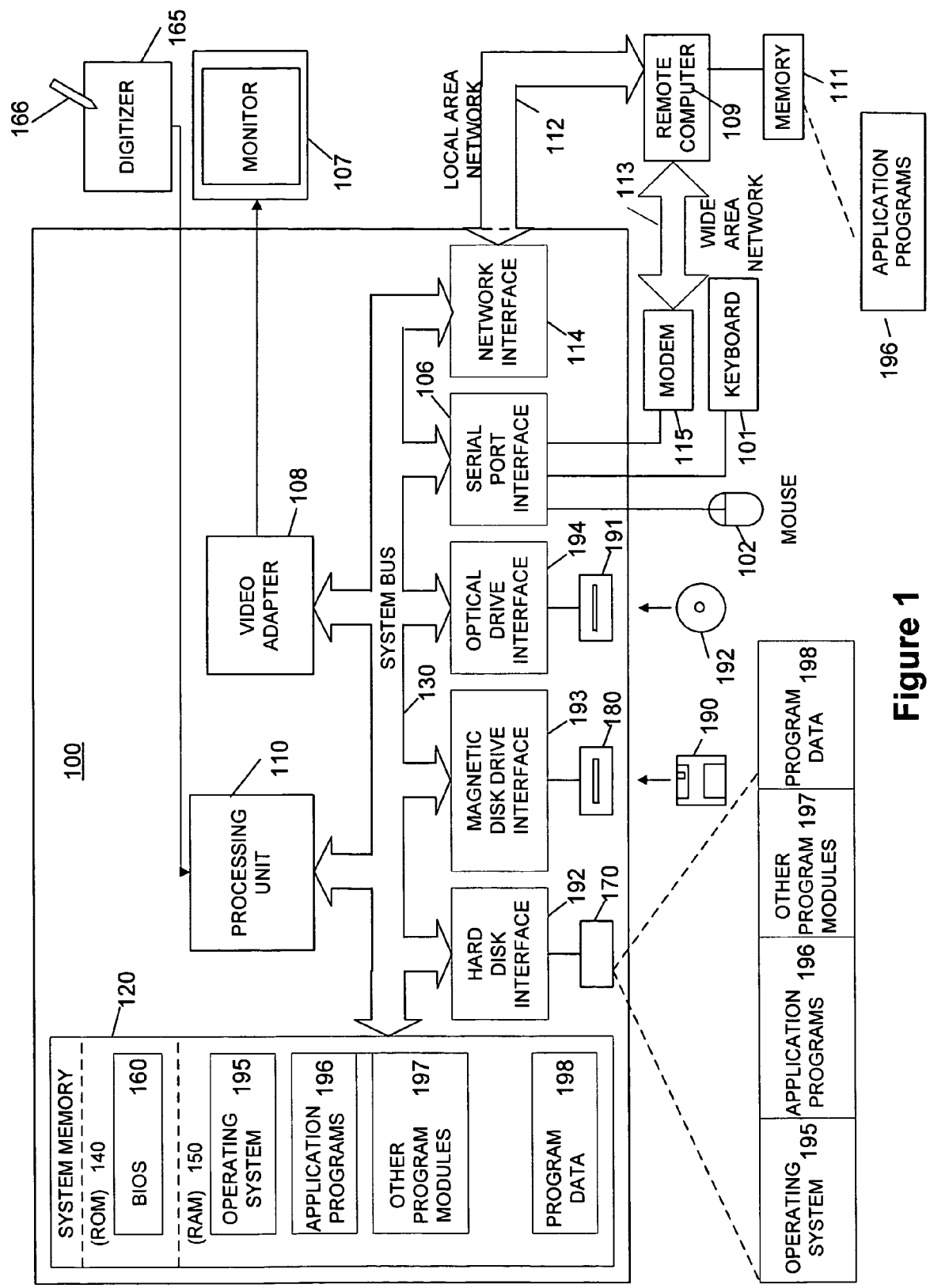
FIG. 1 shows a schematic diagram of a general-purpose digital computing environment that can be used to implement various aspects of the invention.

The following description is divided into sub-sections to assist the reader. The sub-sections include: characteristics and storage of ink; terms; general-purpose computer and associated hardware; an example of strokes of ink; property blocks, tables, and indices; counts, sizes and data of property blocks, tables and indices; common properties; encoding of values; reading and writing properties, and a summarization of the storage of ink.

While described with respect to the storage of ink, it is appreciated that the storage structures defined herein may be applied to non-ink items as well. For the purposes of this disclosure, ink objects are used as an example. Other objects reflecting information having properties may equally be used as well but are omitted for simplicity. For example, the storage structures may be applied to text (with properties including bold, font face, underline, margin settings and the like), graphics (with properties including modifications), non-modifiable information with subsequent modifications (for example, non-modifiable images with properties comprising subsequent comments), displayed information, and the like.

Characteristics and Storage of Ink

The present invention relates to the storage of electronic ink and/or properties or other data associated with electronic ink. Ink as used herein refers to electronic ink. Ink refers to a sequence of strokes, where each stroke is comprised of a sequence of points. The points may be represented using a variety of known techniques including Cartesian coordinates (X, Y), polar coordinates (r, Θ), and other techniques as known in the art.

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve).

To provide the look and feel of physical ink, the exemplary disclosed system and method store ink strokes and properties associated with the ink strokes to more fully render ink. In some embodiments, ink may be stored as a series or set of strokes and a series or set of properties. In other embodiments, ink may be stored with a complex series of properties in which the properties have properties of their own. Properties of the ink may include, for example, color, width, pressure between the stylus and tablet, and angle between the stylus and tablet, and pen shape and the like. While these properties may suffice for many applications, embodiments of the present invention provide for the extensible storage of custom properties (and other data) generated by applications. All strokes and values may be stored directly with excess information. However, alternative embodiments reflect considerations that eliminate excess information when possible or practicable.

The properties used to define an ink object and the strokes within the ink object may have varying scope. For example, some properties may apply to all ink strokes in an ink object (e.g., the shape of a pen tip). Other properties may relate only to a specific point (e.g., a point at which a stylus starts a stroke). Others may relate to specific strokes while others may relate to packets of information as reported by hardware (e.g., coordinates, pressure, angle of pen, the intervals of time between reported coordinates, and the like). In short, properties have different levels of scope.

To efficiently store properties, some may be explicitly specified while others may be implicit. In a simple example, all properties may be default properties and not specified in an ink object. So, the ink object may only have X and Y coordinate values. In another example, the ink object may have properties that affect the entire ink object but the properties are specified in the ink object. In a third example, some strokes may have a first set of properties and others have a second set of properties. The properties may be defined initially at the beginning of the ink object and the individual strokes may reference the previously defined properties as needed. Using this approach of defining properties then later referencing the properties promotes a greater efficiency in storing properties. This becomes more apparent as an ink object becomes larger as the number of properties increases and the number of ink strokes referencing the properties increases.

Terms

Ink—A sequence or set of strokes with properties. A sequence of strokes may include strokes in an ordered form. The sequence may be ordered by the time captured or by where the strokes appear on a page. Other orders are possible. A set of strokes may includes sequences of strokes or unordered strokes or any combination thereof Stream—A sequence of strokes that may or may not include properties that comprises a data structure.

Ink object—A data structure storing a stream with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

Virtual Ink Space—A framework to which all ink strokes relate. The framework may include a two or three-dimensional shape. In one example, the framework may include a unit size square. In another example, the framework may include a defined rectangle. While some ink strokes may extend outside of the framework, the framework may be used for rendering purposes including dimensioning for a printer or a display. In one aspect, the framework is a norm to which ink strokes may be spatially defined.

Global Ink Properties—These are properties that apply to a stroke or set of strokes unless otherwise defined. For example, a selected ink color may be blue. By setting all strokes to blue, the default color of the strokes would be blue.

Local Ink Properties—These are properties that apply to a specific stroke (or data point or data points). For example, while a global ink property may be blue, a specific stroke may be set to red. Some local ink properties may be interpreted, in some cases, as global properties as they affect subsequently encountered strokes in an ink object. It is noted that properties may or may not be labeled as global or local. In some examples, the created data structure defines the scope of the properties.

Render—The process of determining how graphics (and/or ink) is to be displayed, whether on a screen or printed, or output into another file format.

General Purpose Computer

FIG. 1 illustrates a schematic diagram of an exemplary conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, Internet and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
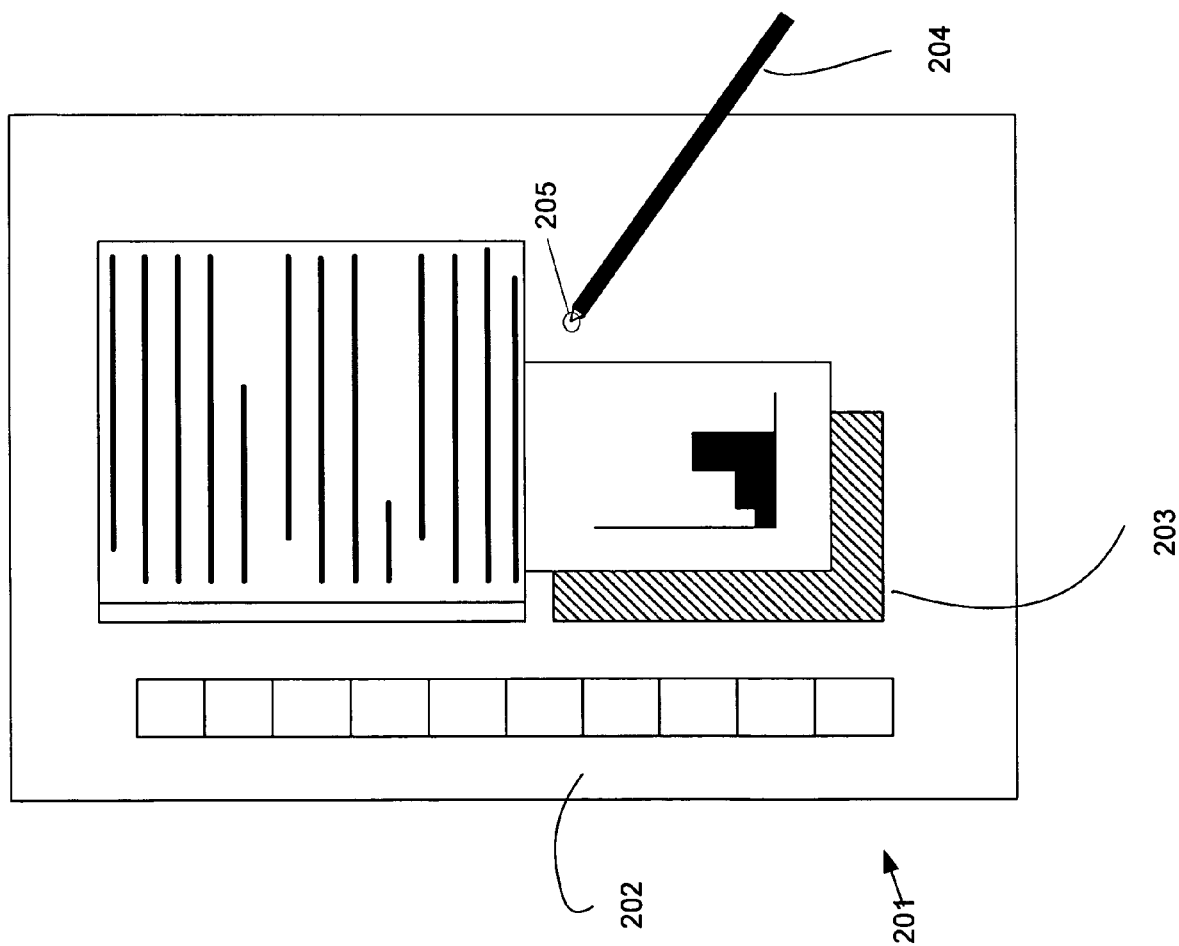
FIG. 2 shows a plan view of a tablet computer and stylus that can be used in accordance with various aspects of the present invention.

FIG. 2 illustrates an exemplary tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation.

An Example of Strokes of Ink

Figure 3:
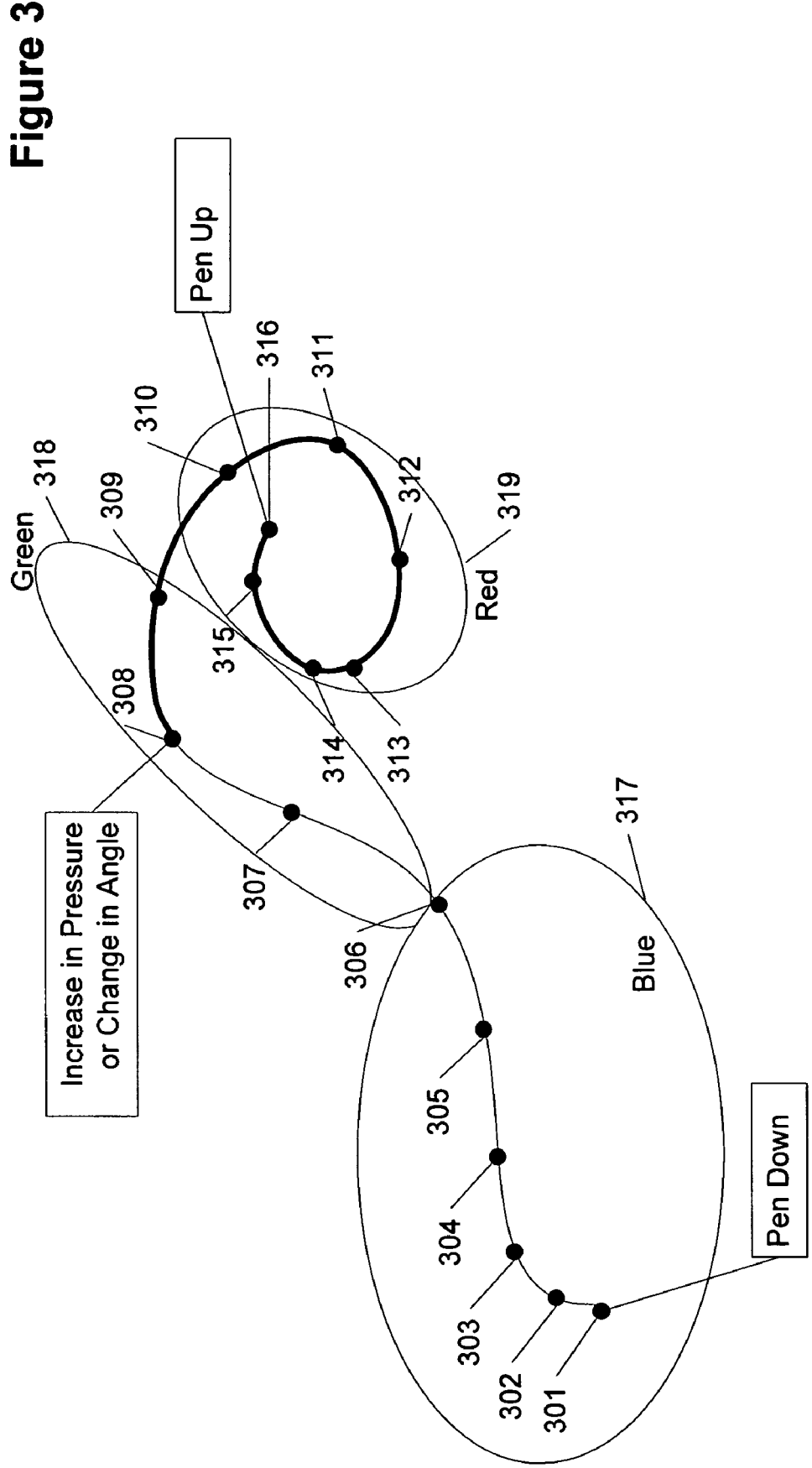
FIG. 3 shows an example of a stroke or strokes of ink having points and properties in accordance with the present invention.

An exemplary ink object is shown in FIG. 3. The ink object starts at point 301 where a pen down action occurred. The pen down action may be stylus 204 contacting the display surface 202, the click of a mouse button, the operation of a button on a trackball or joystick, or the like. The user controls an input device (such as stylus 204) and the resulting stroke continues through points 302–316. At point 316, a pen up action occurred. The pen up action may be the lifting of the stylus 204 off the display surface 204, releasing or another operation of a mouse button, or the operation of the button (or other buttons) on the trackball or joystick or the like. Here, a pen up action and a pen down action are known in the pen digitizing art.

From points 301 through 308, the width of the stroke has a first value. At point 308, the width of the stroke changes to a second value. This may have been because the user increased the pressure between the stylus 204 tip and the display surface 202, because the angle between the stylus 204 and the tablet changed, because the stylus 204 was rotated and projected a different cross section of the stylus 204's nib, or the like. The stroke then continues through point 316 with the second stroke width. In an alternate embodiment, a user started the stroke with a first line width and selected a different line width at point 308 to complete the stroke. In a further embodiment, two strokes may form the ink object as shown in FIG. 3. For example, a first stroke may include points 301–308 and a second stroke may include points 308–316.

In a further embodiment, the ink of FIG. 3 may be represented as four or more strokes. Here, the stroke or strokes from points 301 to 306 may be blue (represented by group 317) with the first stroke width, the stroke or strokes from points 306 to 308 may be green (group 318) with the first stroke width, the stroke or strokes from points 308 to 309 may be green (also as part of group 318) with the second stroke width, and strokes or strokes from points 309 to 316 may be red (group 319) with the second stroke width.

Next, the ink object may be stored (or transmitted or displayed or the like). The ink object stroke may be represented as a single stroke with varying line widths and colors. Alternatively, the ink object may be stored as a variety of strokes having a few data points in which each stroke has its own set of properties. Third, the ink object may be stored as short strokes between points. In short, the ink object may represent a stroke in a variety of forms.

Figure 4:
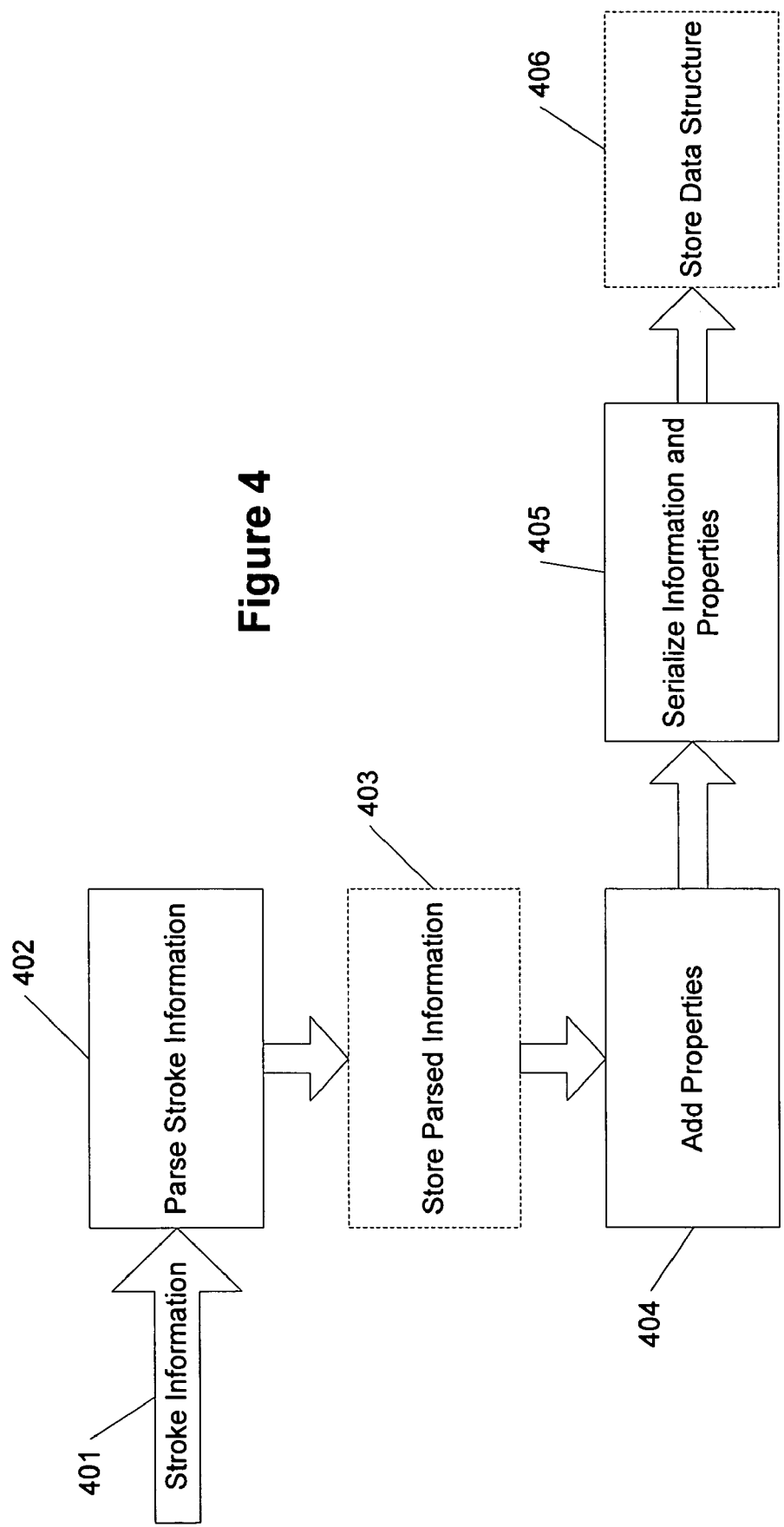
FIG. 4 shows a flowchart showing a process for serializing ink strokes and their properties in accordance with embodiments of the present invention.

FIG. 4 shows an exemplary method for storing the stroke or various strokes of FIG. 3. First, in step 401, stroke information is received. This information may come from a display surface 202 or any other source that is capable of generating strokes. Next, in step 402, the system 201 parses the stroke information 402. The system may parse a number of items including, for example, pressure information, stylus 204 tilt information, position information and the like. The parsed information may be temporarily stored in step 403 (as shown as an option by the dotted box of 403), properties added in step 304 (for example, global and/or local properties) and serialized in step 405. Optionally, the data structure may be stored in step 406 (as shown by the dotted box of 406). Alternatively the data structure may be forwarded to another device, displayed, further manipulated, and the like. Co-pending U.S. Ser. No. 09/852,799 discloses various tagged structures, which are incorporated by reference.

Property Blocks, Tables, and Indices

Figure 5:
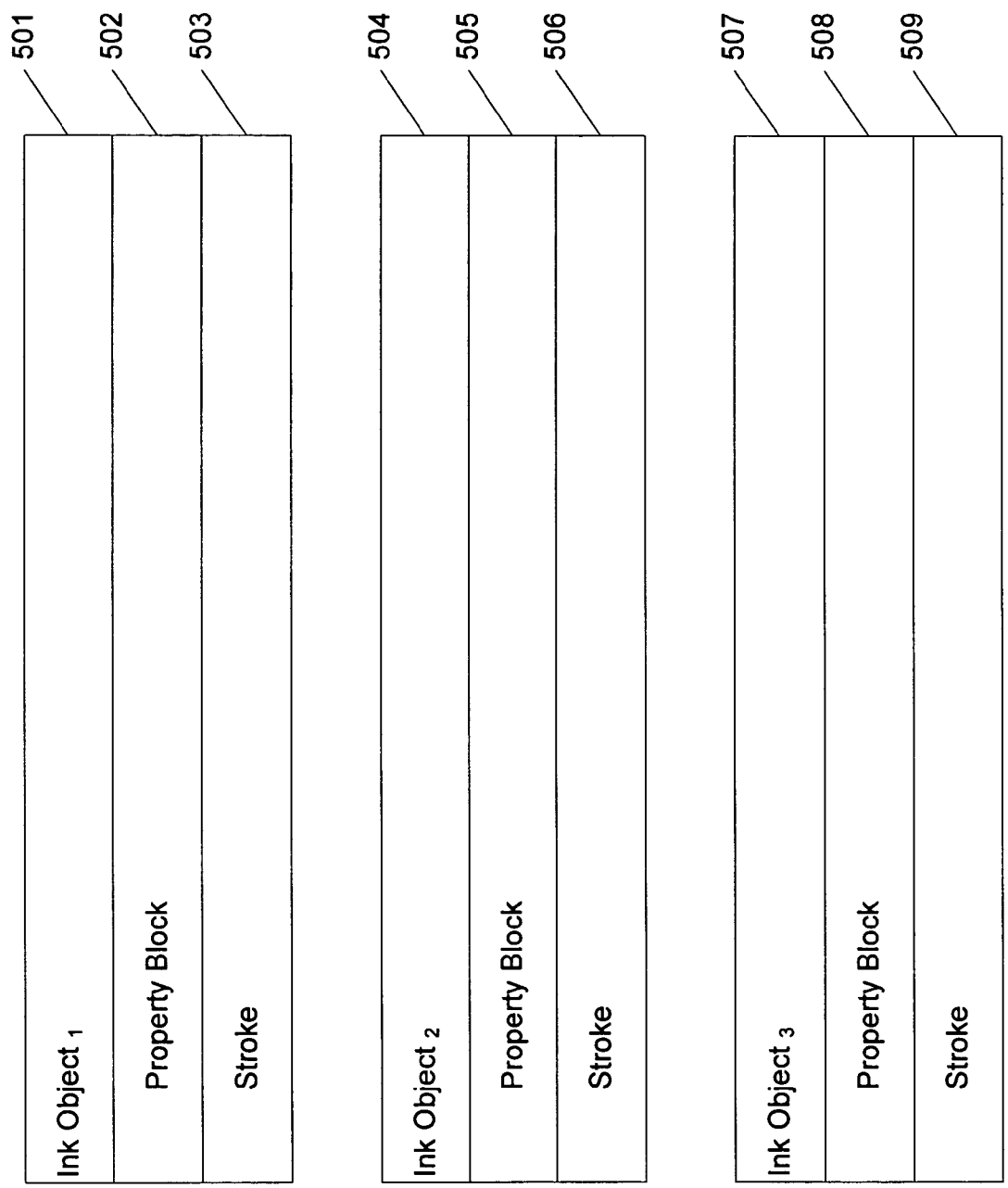
FIGS. 5–13 show various data structures for storing ink and, where relevant, properties associated with ink in accordance with embodiments of the present invention.

FIG. 5 shows a representation of three ink objects$_{1-3}$ 501, 504, and 507 with property blocks 502, 505, and 508 and strokes 503, 506, and 509, respectively. If each property block is different and/or each stroke is not related to the previous strokes, then the representations of the ink objects may each have a minimum possible size. However, if the property blocks 502, 505, and 508 are in at least one way redundant, the separate representations may include redundant information.

Figure 6:
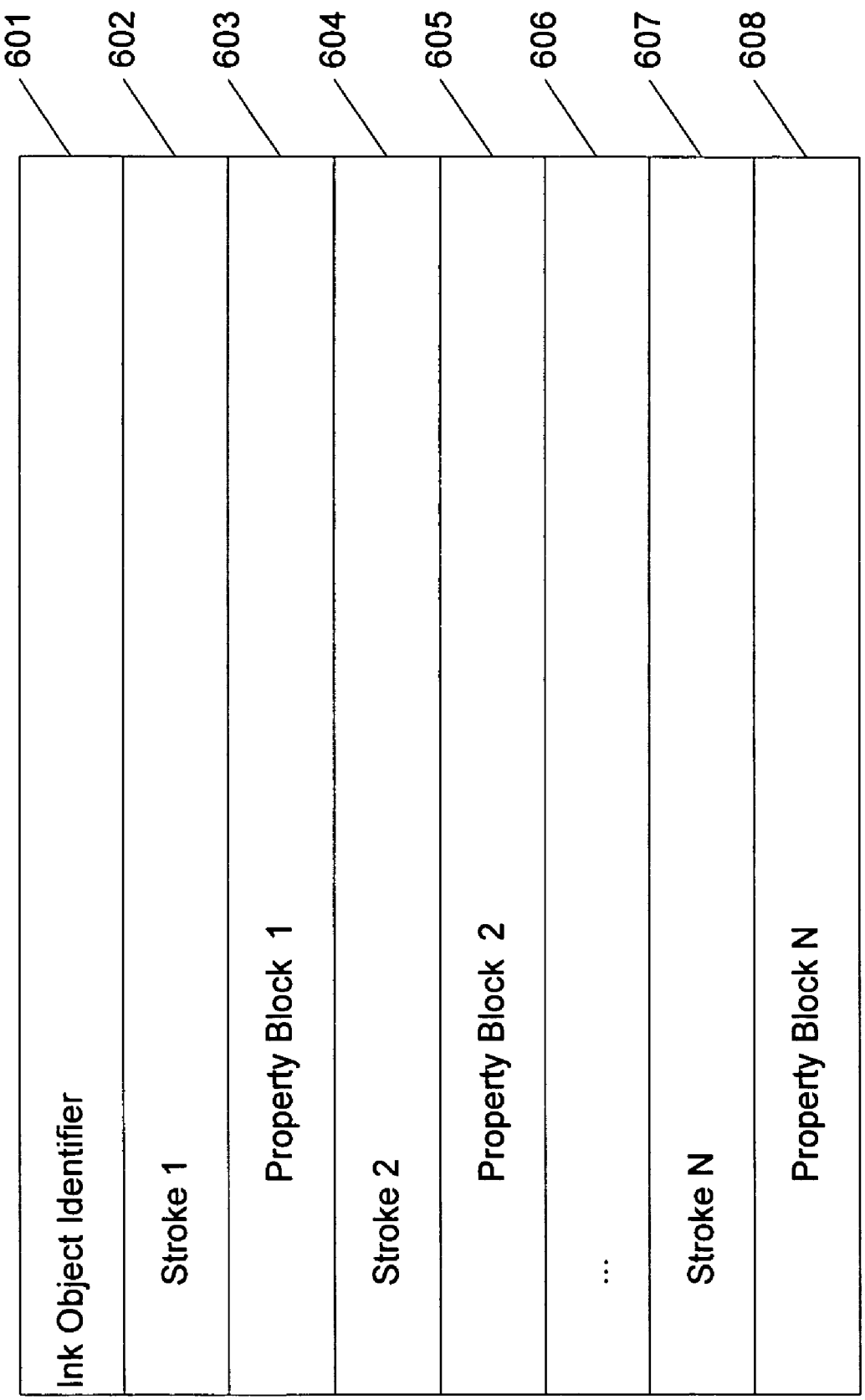

FIG. 6 shows an alternative representation of ink strokes. Here, strokes (602, 604, and 606) have been combined into one ink object. Here, portion 601 is an identifier identifying the ink object as an ink object. The ink object includes stroke 1 602, stroke 2 604, through stroke N 607, with property block 1 603, property block 2, and property bloc N 608 associated with the stokes, respectively. The structure of FIG. 6 provides the advantage over the structure of FIG. 5 in that the ink object identifier 601 is not repeated. This results in a savings of the length of the deleted ink object identifiers in the resulting file structure.

The ink object identifier 601 identifies the following data structure as an ink object. The ink object identifier may also include version information that relates to the version of the software used to write the data structure storing the ink object.

Figure 7:
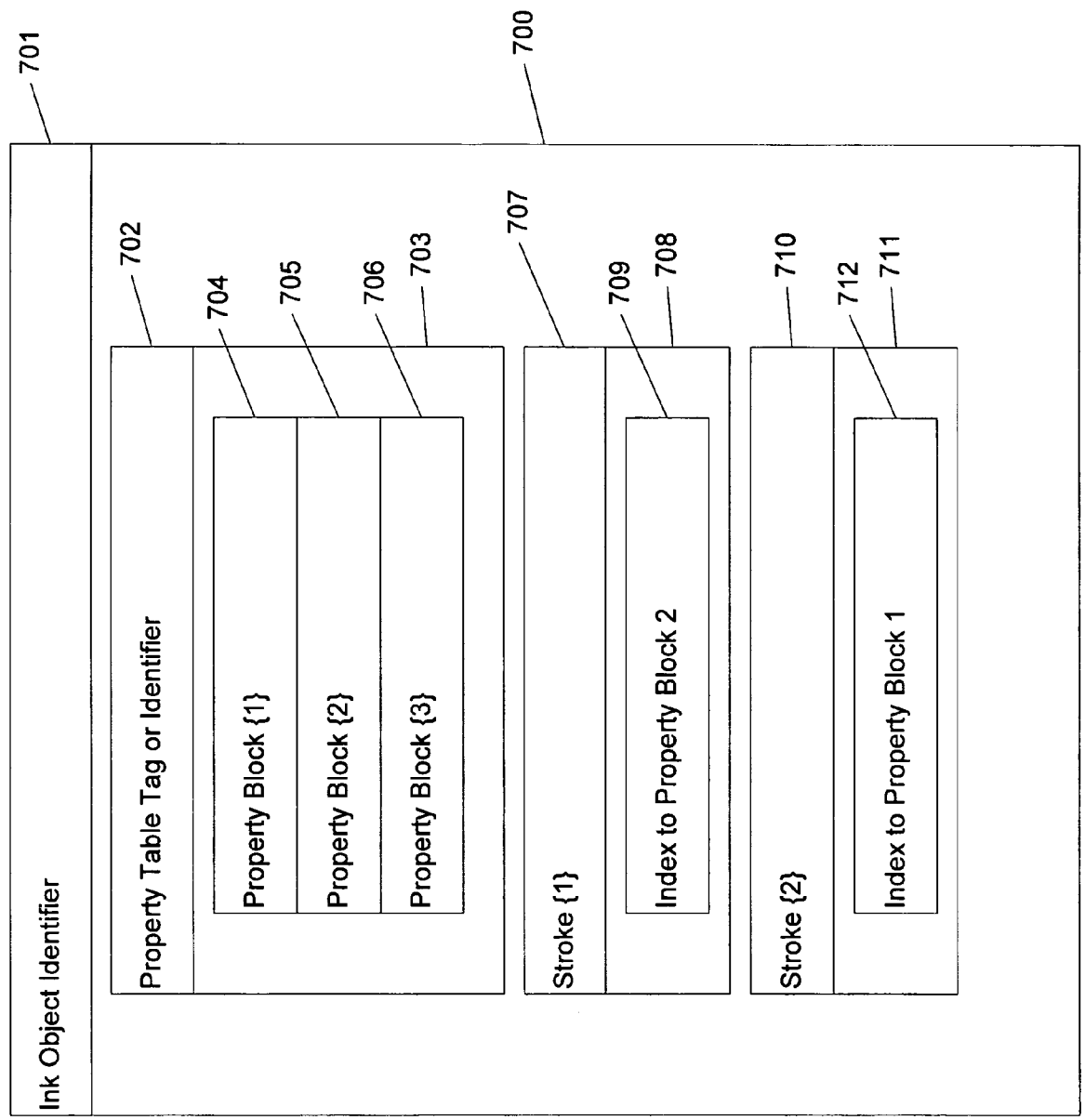

FIG. 7 shows another alternative representation of a data structure 700. Ink object identifier 701 is followed by a property table 703 with a property table identifier or tag 702. The property table 703 contains a number of property blocks (704–706). The property blocks 704–706 are shown with optional identifiers shown in braces (namely "{1}," "{2}," and "{3}") for the three property blocks 704–706. The identifiers may be specified. Alternatively, the block identifiers may be implicit by the ordering of the property blocks as appearing in the property table 703. So, for example, property block 704 is referenced as "1" as it is the first property block, property block 705 is referenced as "2" as it is the second property block, and property block 706 is referenced as "3" as it is the third property block in the table.

FIG. 7 also shows strokes 1 and 2 (708 with a stroke identifier tag 707 and 711 with stroke identifier tag 710). The first stroke 708 may include an explicit indication of its stroke number (here, {1}). Alternatively, the stroke number may be eliminated as the stroke number may be realized by its order relative to other strokes. Similarly, stroke 711 (with identifier 710) may or may not contain stroke number "{2}". Both strokes 708 and 711 include indices 709 and 712, which specifically reference which property block 704–706) relates to the stroke (708 or 711). The structure of FIG. 7 provides the benefit of eliminating the redundant recitation of property blocks. Rather, each stroke contains a reference (through index 709 or 712, for example) back to the property block that specifies its properties.

FIG. 7 further illustrates how property blocks may have varying scope. For example, if a property block is only used once, it may be referred to as having a local scope. If a property block is used more than once, it may be referred to as having something more than a local scope. In some cases, it may be referred to as having a global scope.

All the property blocks do not need to be referenced by contained strokes. For example, property block 706 may relate to a default property block. In an alternate embodiment, only the property blocks that are referenced by the strokes appear in the property table 703. In a further embodiment, default property blocks are not specified in the property table 703. If default properties blocks are used, the strokes may specify a predetermined index (for example, 0 or 255 or the like). Alternatively, a stroke with no index may indicate that the default property block is to be used.

Figure 8:
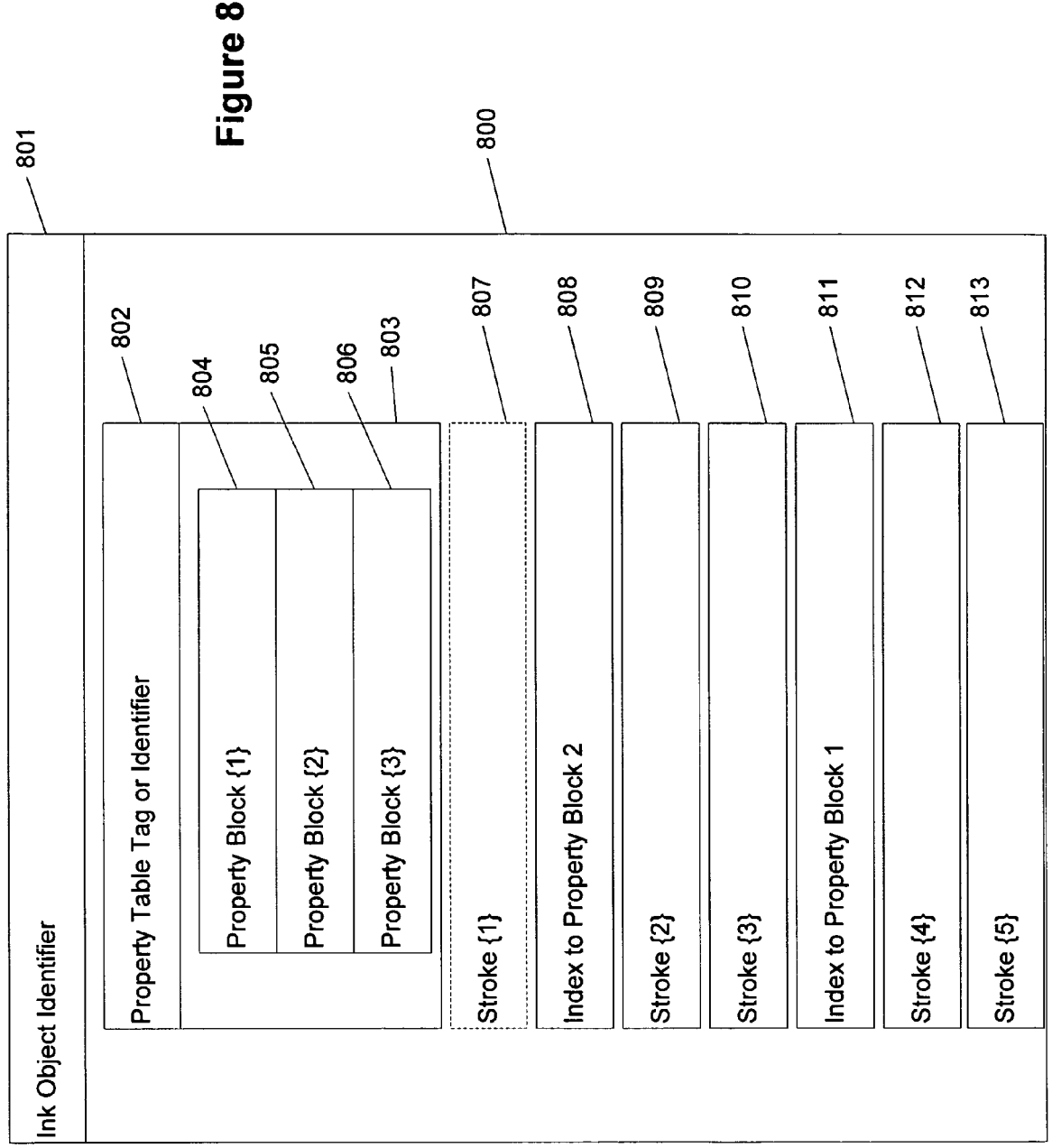

FIG. 8 shows another embodiment of a data structure. Ink object 800 with an ink object identifier 801 contains a property table 803 and five strokes (807, 809, 810, 812, and 813). The property table 803 (with property identifier or tag 802) includes property blocks 804, 805, and 806). The ink object 800 also contains two indices (an index 808 to property block 2 805 and an index 811 to property block 1 804). The two indices are located between strokes 1 807 and 2 809 and between strokes 3 810 and 4 812, respectively. Stroke 1 807 does not have a preceding index. In one example, stroke 1 807 may have properties specified by a default property block (not shown). In another example, stroke 1 807 may have an implicit index to the first property block (here, property block 1 804). In a third example, stroke 1 807 may not appear (rather, pushed down in the data structure to appear after at least one index) as shown by the dotted box of stroke 1 807).

Strokes 3 810 and 5 813 do not have immediately preceding indices. In one example, this may indicate that strokes 3 810 and 5 813 are to have properties specified by the default property block (not shows). In an alternate example, the strokes 3 810 and 5 813 use the most recent preceding index. Stroke 3 810 would use index 808. Stroke 5 813 would use index 811. Eliminating the recitation of an index for strokes 3 810 and 5 813 helps reduce the size of the ink object by the space that would have been consumed by separate indices for strokes 3 810 and 5 813.

Figure 9:
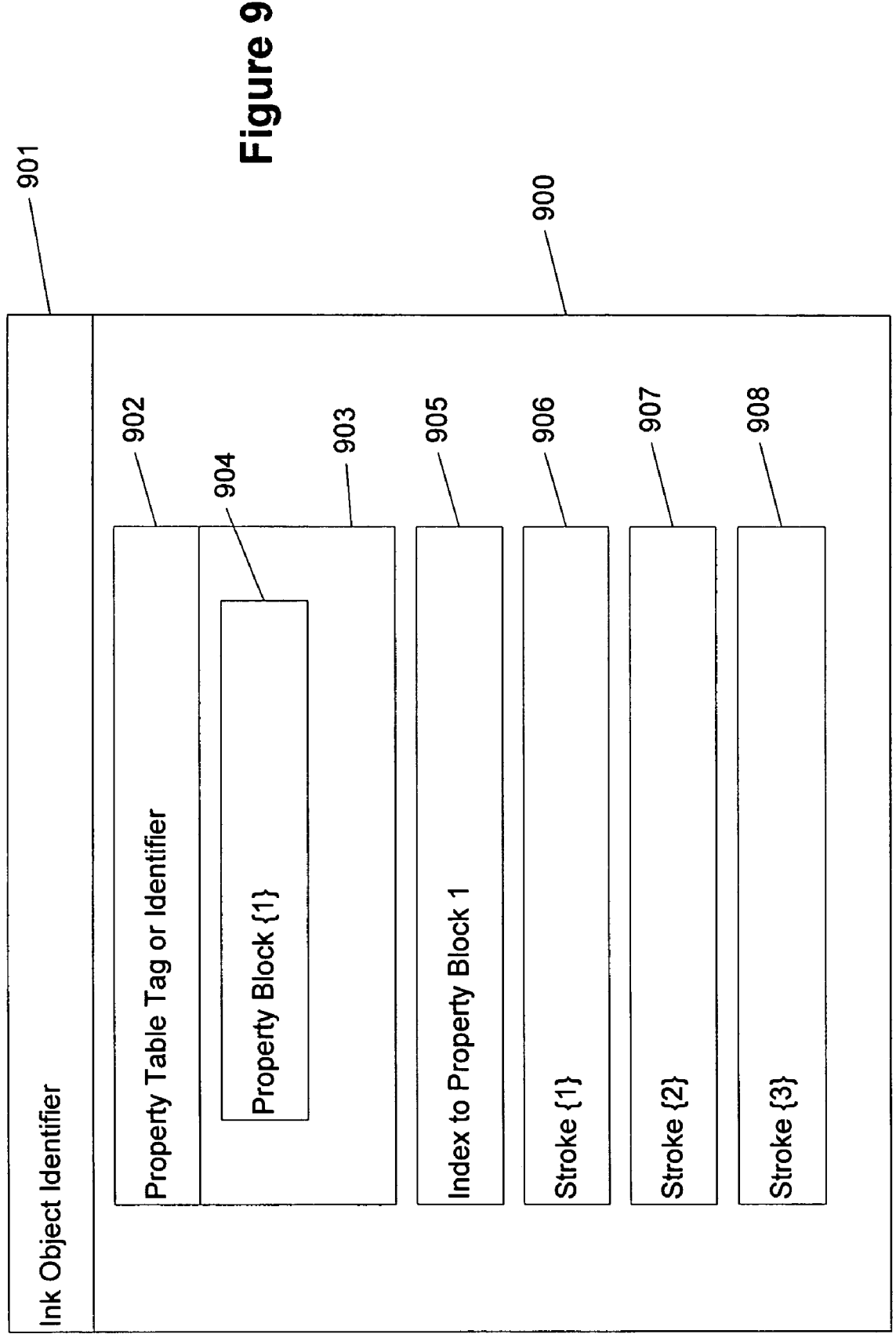

FIG. 9 shows another data structure 900 with an identifier 901 that includes a property table 903. The property table 903 with an identifier or tag 902 includes only one property block, namely property block 1 904. The ink object 900 includes an index 905 to the sole property block 904. The strokes 1–3 (906–908) all have properties from property block 904.

Figure 10:
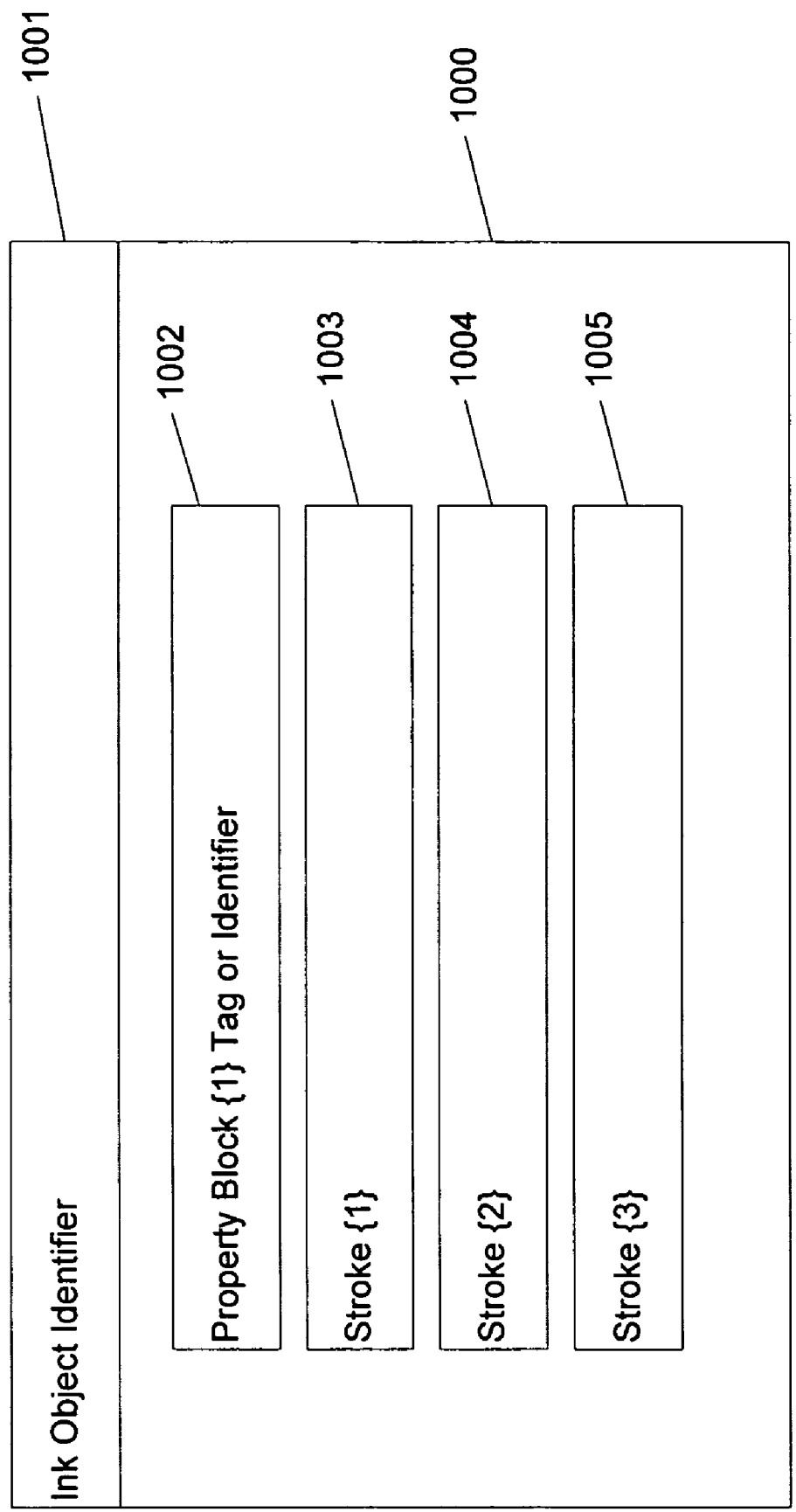

FIG. 10 shows an alternative to the data structure of FIG. 9. In FIG. 10, the property table 903 with the nested property block 904 has been replaced by property block 1002. Also, because there is no table, the index 905 may be omitted. In this alternative example, the data structure of FIG. 10 saves space over the data structure of FIG. 9 equivalent to the size of the identifier 902 and the index 905.

Figure 11:
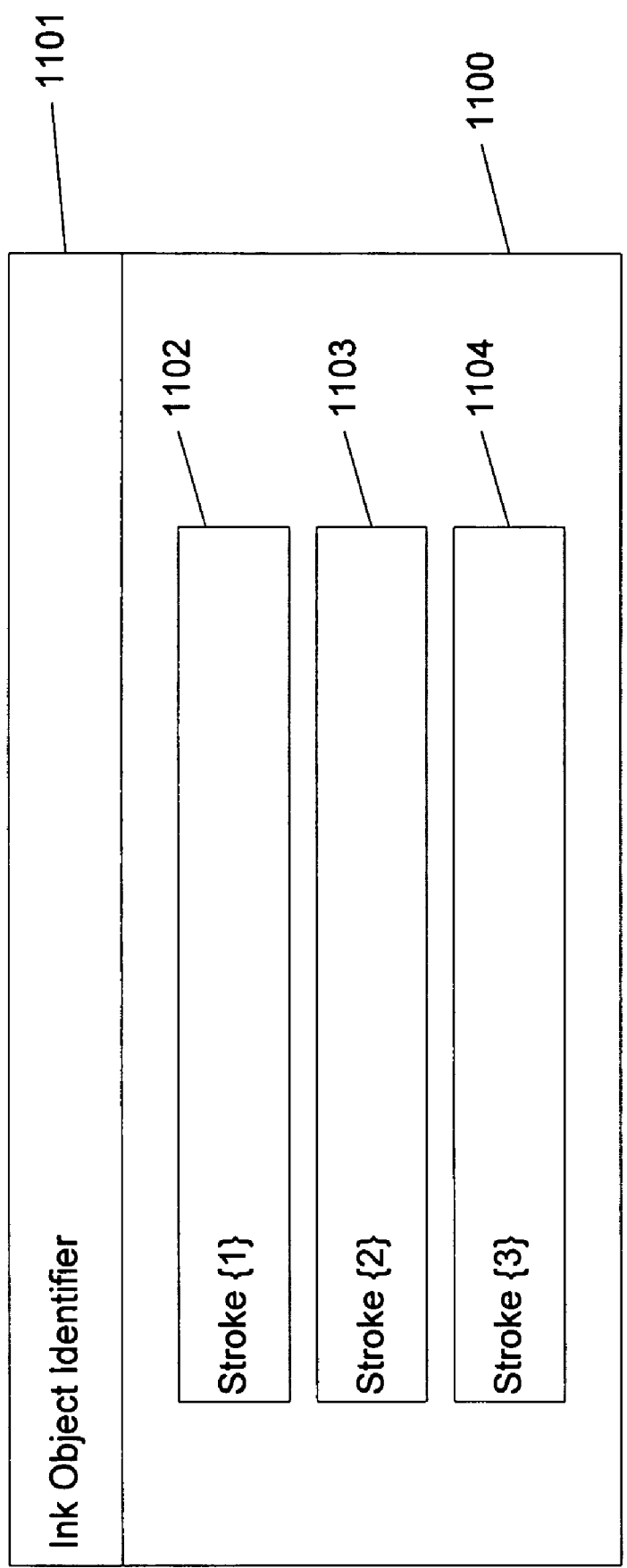

FIG. 11 shows another exemplary embodiment of a data structure 1100. The data structure 1100 includes an identifier 1101 and three strokes 1–3 1102–1104. Here, the strokes all use the default properties. The default properties may be specified in a memory, in a separately stored data structure or other locations as known in the art.

Counts, Sizes and Data of Property Blocks, Tables and Indices

Figure 12:
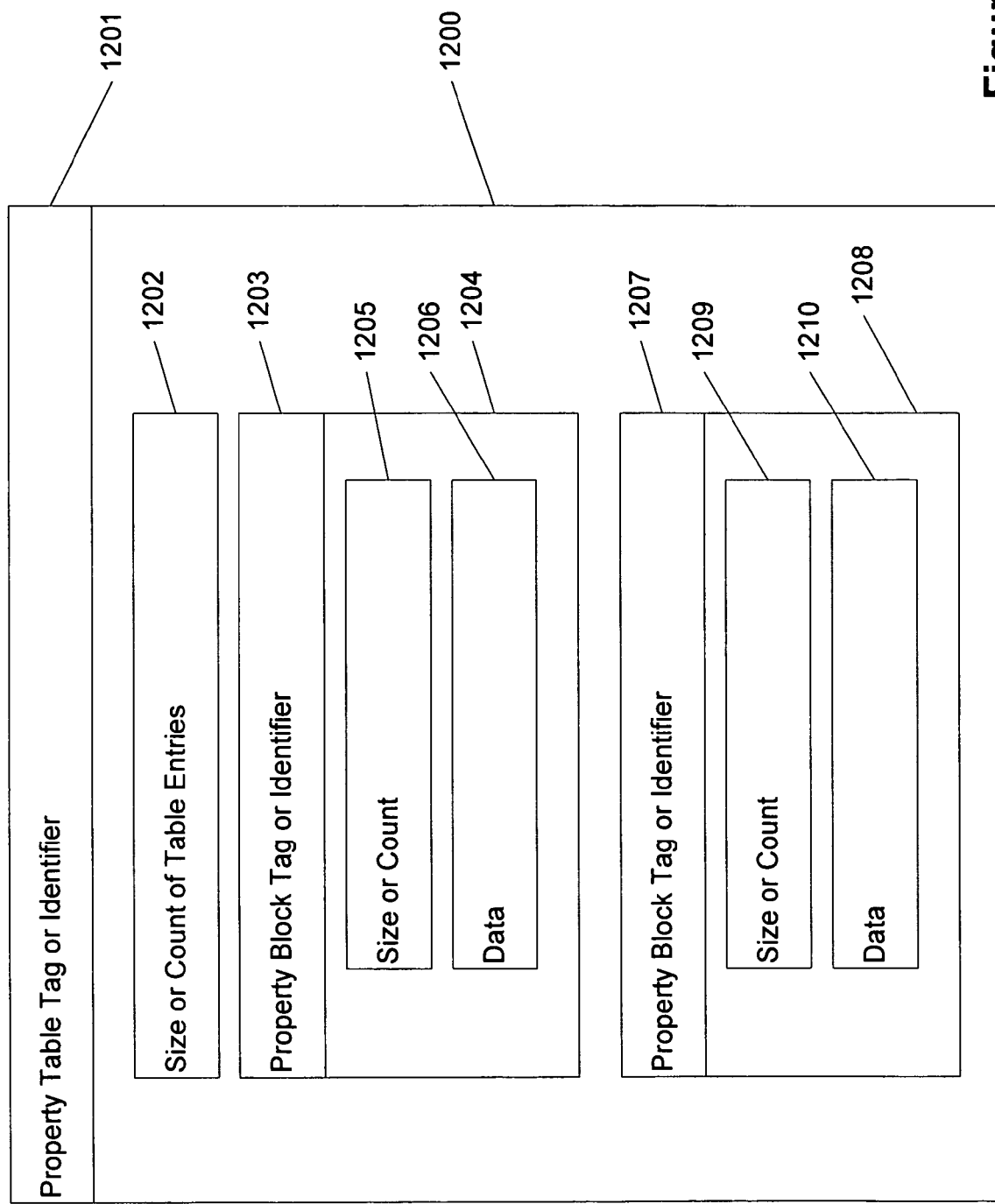

FIG. 12 shows an embodiment of a property table 1200. The table 1200 includes a property table tag or identifier 1201. Following identifier 1201 is the size or count of the number of table entries 1202. The table 1200 contains property block 1204 with identifier 1203 and size or count information 1205 followed by the data for the property block 1206. Also contained in the table 1200 is another property block 1208 with tag or identifier 1207 with size or count information 1209 followed by the data for the property block 1210.

Here, the identifier 1201 is generally referred to as a tag (or TAG or Tag). A "Tagged" structure, as shown in FIG. 12, begins with an identifying "tag" followed by a "size field" followed by data. The "tag" identifies the contents of the data while the "size field" identifies, for example, the size of the data in bytes (or bits and the like). The tag may be either a predefined tag or an application-specific custom tag. In alternate embodiments, the size of the tagged field may appear prior to the tag itself.

The structure as shown in FIG. 12 may also include a count of the number of objects, tags, properties, strokes, and the like contained within it. In this regard, the "count" identifier may be used in place of the "size" identifier. If one specifies the size of the rest of the data of the tag, a system may then quickly skip over the rest of the data of the tag if desired. On the other hand, if the count of the number of objects (or properties or the like) was specified, the physical size of the count would likely be smaller than the physical size of the remaining data. In this regard, the ink object would be smaller if a count of remaining objects (or the like) was used rather than a size of the remaining data. However, to skip over the remaining part of an ink object or property, one may need to enumerate all of the sub-objects (or sub-tags or sub-properties) contained within the object or tag. To enumerate these sub-parts, a system may need to perform additional calculations to obtain the number of sub-parts. Further, a system may need to perform additional steps on the skipping operation (for example, advancing past the present object or tag or property) by counting the sub-parts in a count-based data structure, rather than advancing to a new position as used in a size-based system.

One benefit of placing the size after the tag itself is that applications that do not recognize the tag may know, by reading the next portion of information (the size block 1202, 1205, 1209), the length of data needed to skip over to arrive at the next tag or end of the ink data structure.

As to the specification of size of following data or the count of items in following data, it is appreciated that one may use either of the two ways of specifying information. For simplicity, the following description includes the use of size information. In some instances, count information is also shown. However, where only size information is shown, count information may readily be specified in place of or in addition to the size information.

As applied to ink, the tagged data structure of FIG. 12 may be enhanced in a number of ways. In some embodiments, ink strokes may be defined to come in order. In other embodiments, global properties (or properties that may affect all subsequent ink strokes) are provided at a known location for the system. For example, all global properties may be specified at the beginning of the ink object. On the other hand, all global properties may be specified at the end of the ink object. One advantage of putting the global properties at the beginning of the ink object is that a system would already know how to handle a stroke that referenced global properties once it encounters the stroke (as it would have already encountered the global properties section of the ink object). In yet more embodiments, custom properties may be defined through various tables. The use at least one of these or other enhancements permit properties to be used throughout the ink object and permit a more efficient storage of ink information.

The "tag" describing the "data" indicates whether the "data" contains tagged structures or even how many tagged structures. For example, custom properties are considered opaque to the present system since they are application-defined and thus only contain data. However, a stroke may have one or more stroke properties, which are also represented as tagged structures.

Figure 13:
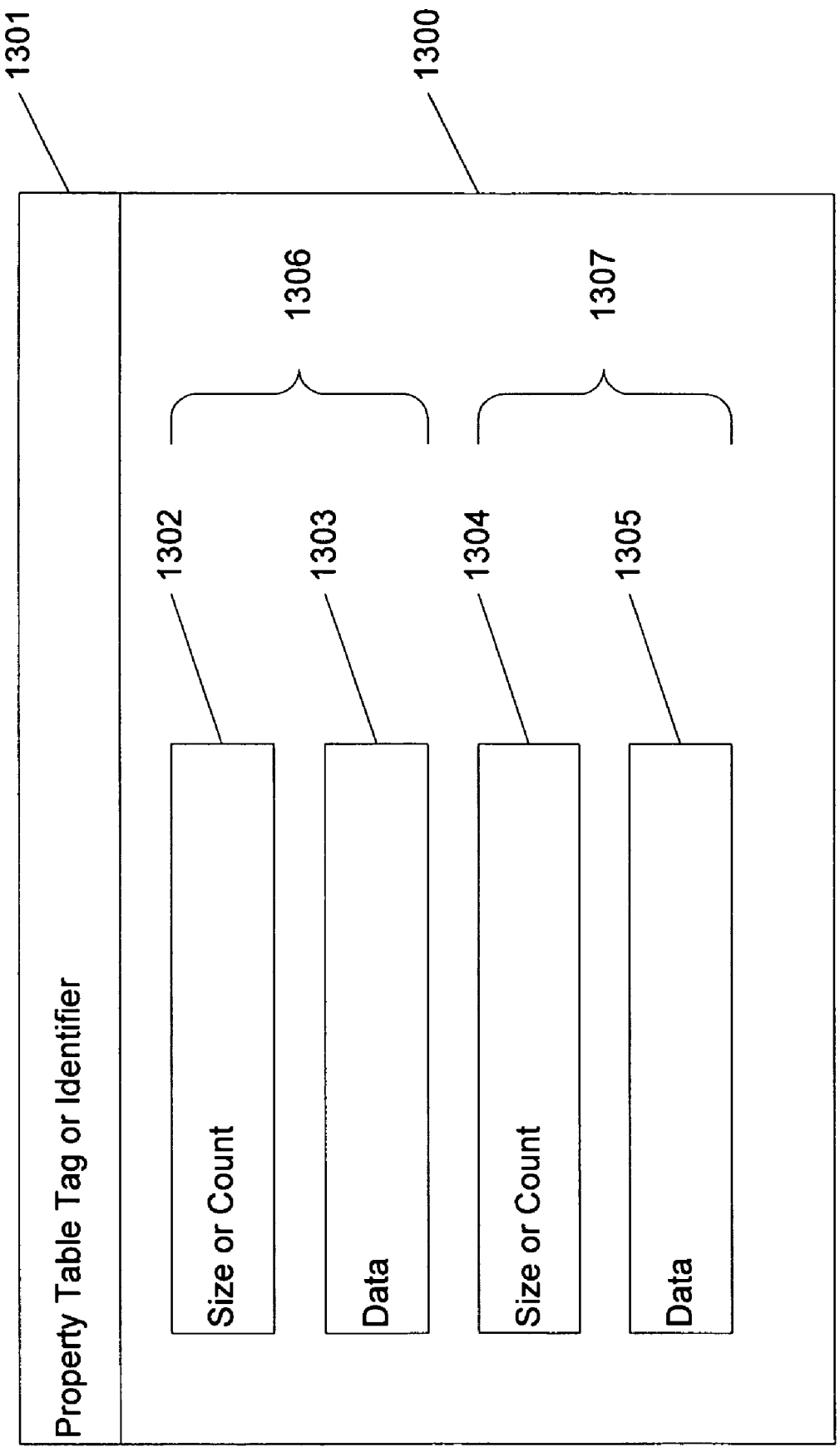

FIG. 13 shows another exemplary embodiment of a data structure 1300. The data structure includes an identifier 1301 a first set of property information 1306 and a second set of property information 1307. The first set 1306 includes data 1303 and size and/or count information relating to the size of data 1303. The second set 1307 includes data 1305 and size or count information 1304 relating to the size of data 1305. One of the benefits of the structure of FIG. 13 over the structure of FIG. 12 is that the structure of FIG. 13 eliminates the property block identifiers 1203 and 1207. Accordingly, the size of the structure 1300 may be smaller than the size of the structure of FIG. 12 by the size of the property block identifiers 1203 and 1207.

Common Properties

Ink properties may be defined to minimize or eliminate redundant information. In simple streams, there may be no ink properties. However, if there are ink properties, then it is preferable that they appear before any strokes so that they may apply to all strokes when needed. It is appreciated that the properties may be placed after the strokes as well. A number of global properties may be used. More or less global properties may be defined and used as needed.

With respect to ink objects, common properties appear. The properties may be grouped into transformation properties, drawing attributes properties, metrics properties, and stroke description properties. Other properties may be defined and used as well. Also, not all (if any) of the specific above-identified properties are required to practice the invention.

Sample implementations of the above common properties are shown. Other properties are addressed in greater detail in co-pending U.S. Ser. No. 09/852,799, which is incorporated by reference.

Transform Properties

Ink objects may be created with a number of different input sources. The input sources may include a variety of tablets with different tablet resolutions. The different tablet resolutions may result in ink drawn on a screen be rendered incorrectly when the created ink is ported to and displayed on a tablet having a different resolution or screen size. To adjust the ink to a common size, a set of transform properties (or transforms) may be stored to indicate how the ink object is to be adjusted to a common size.

As described above, ink may be captured in a variety of ways. The ink may be made larger or smaller, rotated, translated, warped, and the like. These transformations present a variety of problems. The first problem is that the assumptions made when designing the compression schemes may no longer be valid. This may result in data that would have been compressed well in its native form to bloat and compress very poorly. The second problem is that it is very easy to perform operations on the ink that would cause precision to be lost. This may cause the recognition process to fail and prevent the ink from being converted to text or might cause the ink to render incorrectly.

To solve this problem, some embodiments of the present system may allow the ink to be stored in its original native format. For example, whenever ink is transformed, only a transform matrix is affected rather than each point in the ink. This preserves the precision of the original ink and also allows compression to function optimally.

Figure 14:
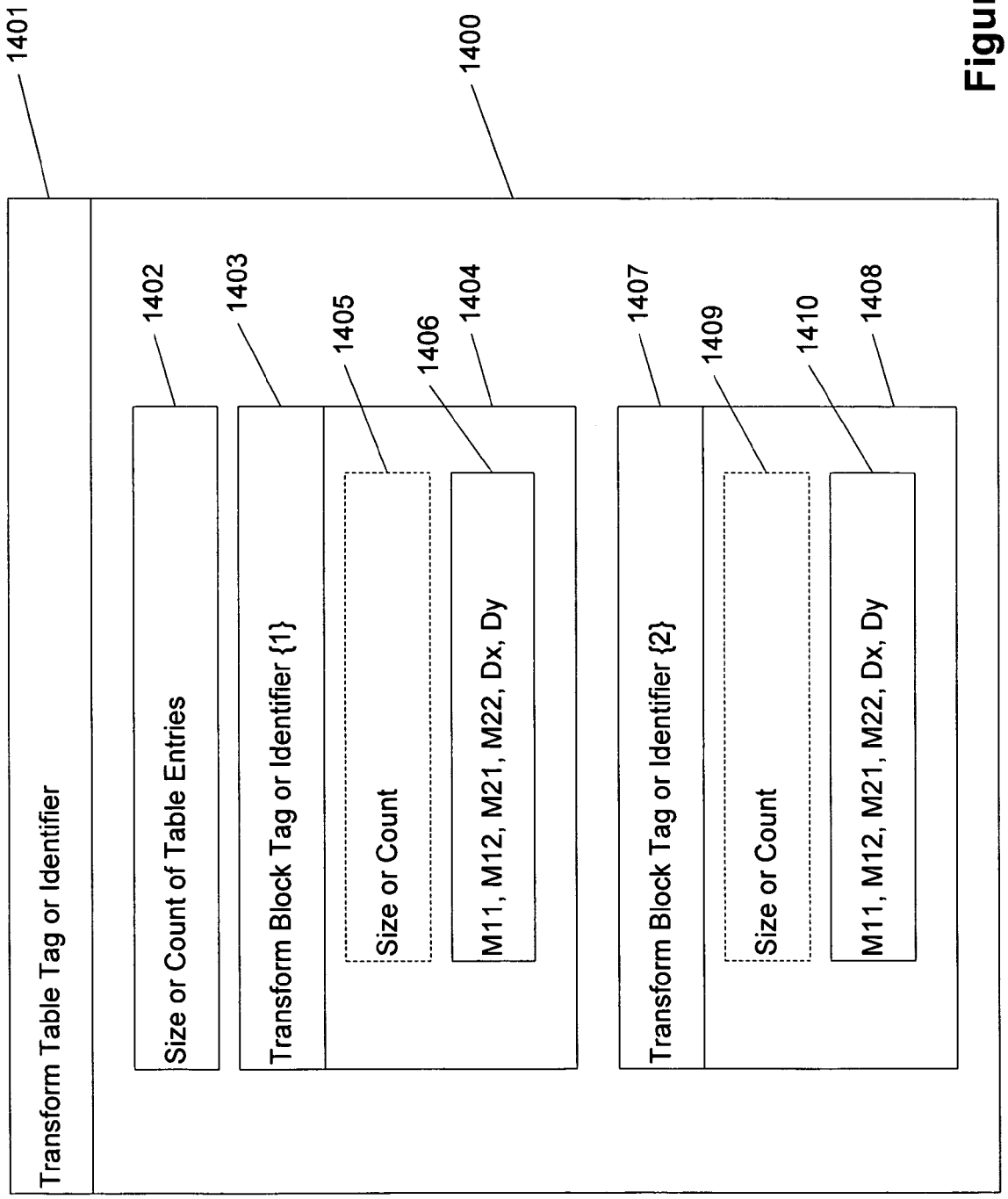
FIG. 14 shows a data structure storing a transform table and transform blocks in accordance with embodiments of the present invention.

FIG. 14 shows a transform table 1400 as including transform blocks 1404 and 1408 that represent the various transform properties that may be used by an ink stream. Each transform block 1404, 1408 may define a unique transform that is applied to the ink points before they are rendered or used. These blocks 1404, 1408 may apply to one or more strokes and are placed in table 1400 so that they are not repeated in each stroke.

One may use the identifier of TAG_TRANSFORM_TABLE as the identifier 1401 to identify the transform table 1400. The size or count of the table may follow 1402. The size of the table may be is equal to the sum of the sizes of all transform blocks. The count may be equal to the number of blocks 1404, 1408 in the transform table 1400.

Each transform block 1404, 1408 may include a transform block identifier 1403, 1407, a size or count field 1405, 1409 and a data field 1406, 1410. To transform a point (X, Y) in two dimensions to a new point (X', Y'), one may use the following two equations:

$$X' = xM11 + y\,M12 + Dx \quad (1)$$

$$Y' = xM21 + yM22 + Dy \quad (2)$$

The two equations provide a general solution for both rotation and translation of a point or points as based on the transformation matrix of six coefficients, namely M11, M12, M21, M22, and Dx and Dy (M11, M12, M21, and M22 being the rotational and scaling coefficients and Dx and Dy being the translational coefficients). A specific solution without rotation may be given by:

$$X' = xM11 + Dx \quad (3)$$

$$Y' = yM22 + Dy \quad (4)$$

The specification of the six coefficients for the transform properties of equations 1 and 2 may be preferable to only specifying the four coefficients of equations 3 and 4 due to the fact that tablets (and/or capture systems may orient captured in differently, for example, the origin being at the top left corner of a screen as opposed to the bottom left of a screen). On the other hand, specifying only four coefficients takes less space.

In one example, if the size of the four or six coefficients is constant (as opposed to the actual values of the coefficients), the size or count fields 1405, 1409 may be eliminated. Further, a transform table containing only one transform block is a special case. As with other properties in which there is only one block, the table tag 1401 and size/count 1402 for the table may be omitted and the entire table may be replaced by a single transform block.

In the simplest case, where the capturing environment and the rendering environment have no transformations between them, as well as in cases where scaling and transforms have been applied outside of a native capture environment, no transform tables may be created.

To assist in the transformation to a common coordinate space, an ink space rectangle that defines a virtual coordinate space (or virtual ink space) for receiving ink may be specified. One tag that may be used includes TAG_INK_SPACE_RECT, which identifies the ink space rectangle when present in the stream. The rectangle does not need a size field it has a fixed number of elements of, for example, four signed numbers. These four numbers represent the left, top, right, and bottom of the ink space. The ink space rectangle defines the virtual coordinate space for the ink. An application may use this rectangle to determine what area of the ink to either display or print. The ink space rectangle essentially defines a virtual sheet of paper that the ink is drawn on. This does not mean that ink may not appear outside this area. However, the application may use this rectangle when deciding how to display the ink according to a given view or on the printer.

Drawing Attributes Properties

The drawing attributes table may list all drawing attribute sets of properties in the stream. Each drawing attribute block defines information used while rendering the ink. These blocks may apply to one or more strokes and may be placed in the drawing attributes table so that they are not repeated in each stroke.

Figure 15:
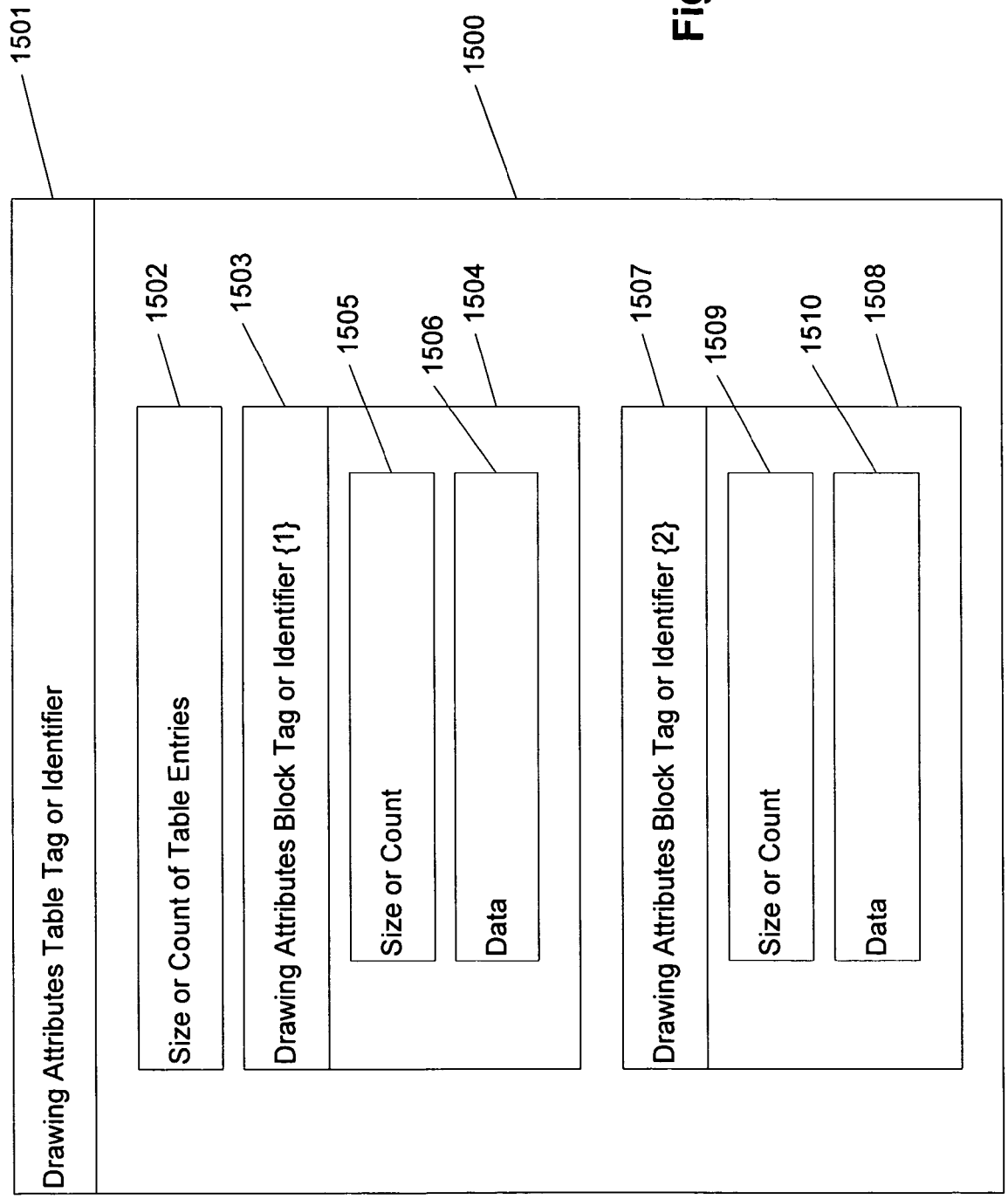
FIG. 15 shows a data structure storing a drawing attributes table with drawing attributes blocks in accordance with embodiments of the present invention.

FIG. 15 shows a drawing attributes table 1500 with identifier 1501. An exemplary tag 1501 includes TAG_DRAW_ATTRS_TABLE as an identifier. This identifier 1501 may be followed by the size or count 1502 of the table. The size of the table may be equal to the sum of the sizes of all drawing attribute blocks. The count may be the number of blocks in the table.

Each drawing attribute block 1504, 1508 starts with an identifier 1503, 1507. Here, the identifier 1503, 1507 may be represented as TAG_DRAW_ATTRS_BLOCK. The identifier 1503, 1507 may be followed by the size/count 1505, 1509 of the block. The block may contain a tagged list of drawing attributes 1506, 1510. Each entry in the list of drawing attributes may be a pre-defined or custom tag.

A drawing attributes table containing only one drawing attributes block is a special case. In one embodiment, the tag and size for the table is omitted and the entire table is replaced by a single drawing attributes block. This reduces information in the drawing attributes table when not needed to define only a single entry.

Figure 16:
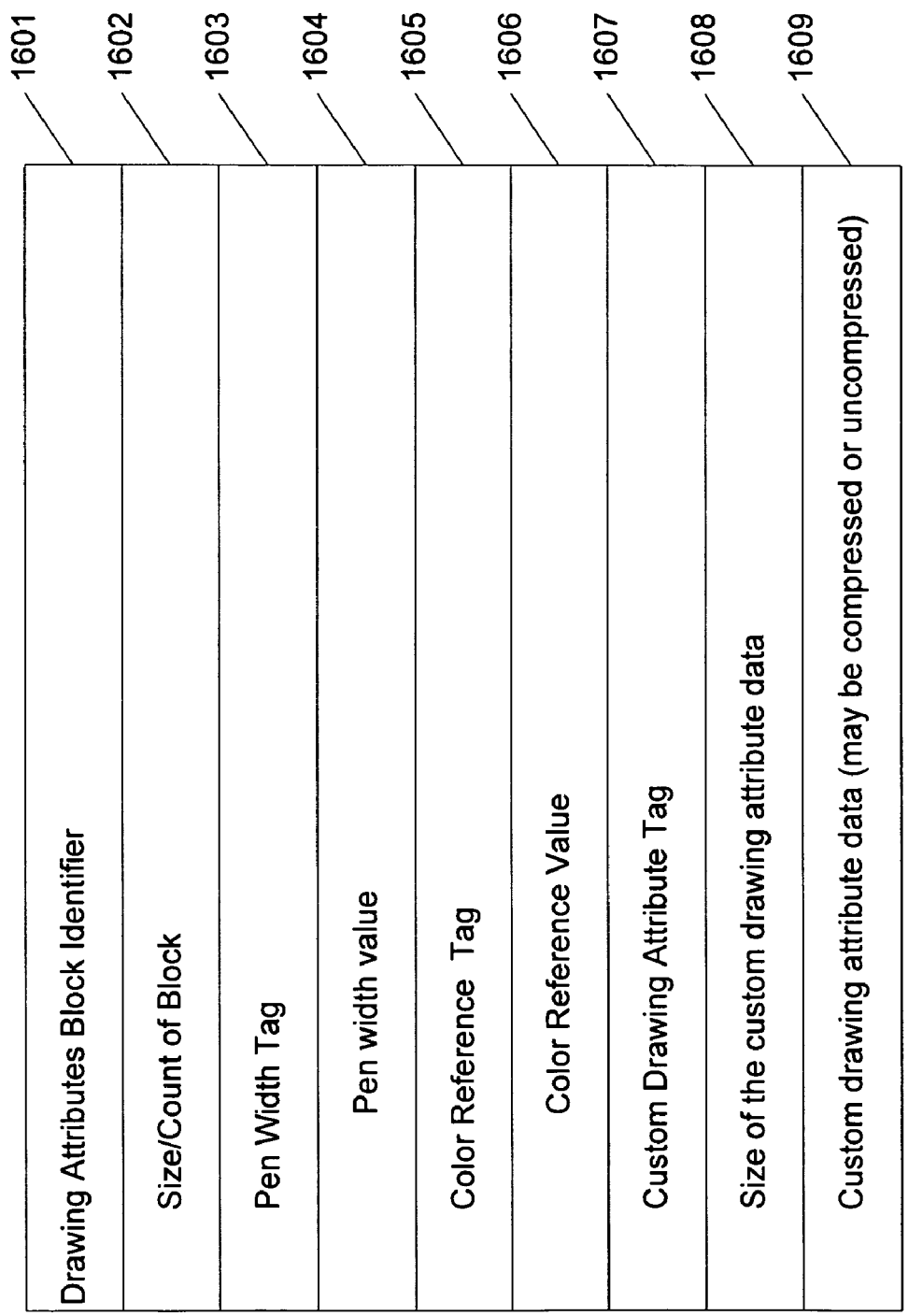
FIG. 16 shows an exemplary data structure storing a drawing attributes block in accordance with embodiments of the present invention.

FIG. 16 shows a sample list of drawing attributes in a drawing attributes block. The block includes an identifier 1601 and a size/count value 1602. For example, a pen width tag 1603 with its accompanying value 1604, a color reference tag 1605 and its accompanying value 1606, a custom drawing attribute tag 1607 with its size 1608, and custom drawing attribute data 1609.

To save space, the tag 1601 for the block may be omitted when the block appears in a drawing attributes table. This is because the table may only contain blocks and the tag is redundant. The next block may start immediately after the end of the previous block.

Furthermore, in some embodiments, property blocks may eliminate the size or count indicators. For example, predefined drawing attributes, such as the pen width or color reference, have no size indicator where the data types (e.g., positive integers) are known ahead of time. However, a custom property preferably has a size field since the size of the data is not known ahead of time.

In one embodiment, default and non-default values are stored. Alternatively, another possible space saving optimization is that drawing attributes that are set to the default value are not stored in the attributes block. In the above example, pen tip value is not stored since it is assumed to be the default value. Here, the pen tip may be considered to be a ballpoint pen as represented by the tag PEN_TIP_BALL.

Further, if multiple properties are stored in a table (for example, properties specifying different types of pen tips (round, square, rectangle, etc.)), a reference to a desired property is stored with each stroke instead of the whole drawing attribute. A similar approach may be used for other shared resources that may apply to multiple strokes.

Metrics Properties

The metric table lists metric blocks in the stream. These blocks may apply to one or more strokes and may be placed in this table so that they are not repeated in each stroke.

Figure 17:
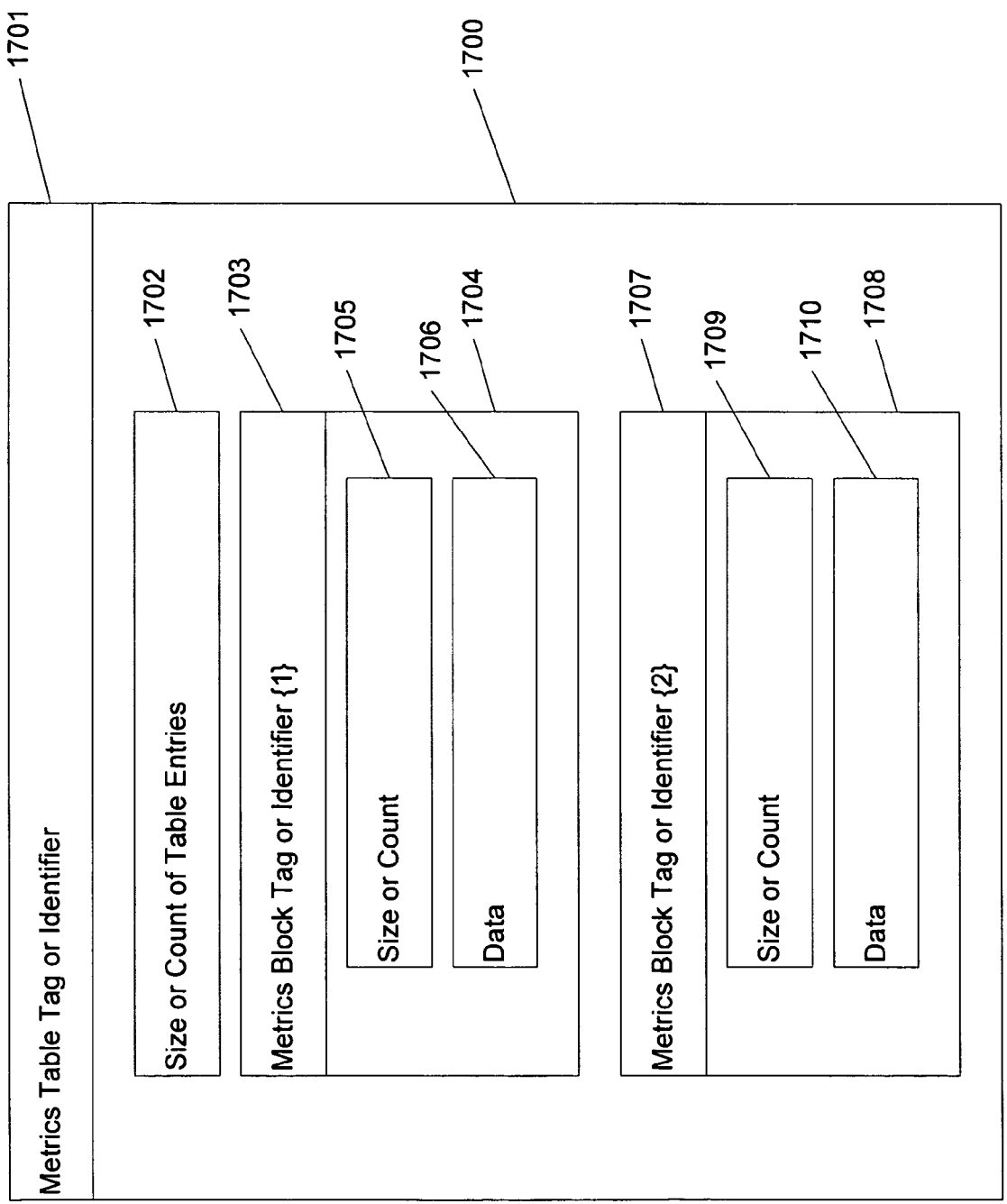
FIG. 17 shows a data structure storing a metrics table and metrics blocks in accordance with embodiments of the present invention.

FIG. 17 shows a metrics table 1700 with identifier 1701. The identifier 1702 may be a tag (e.g., TAG_METRIC_TABLE) to identify the metric table and may be followed by the size or count 1702 of the table. The size or count 1702 of the table is equal to the sum of the sizes of all metric blocks or the number of metric blocks. The metrics table 1700 includes metric blocks 1704, 1708 with identifiers 1703, 1707. Each metric block 1704, 1708 may include a size/count field 1705, 1709 and data 1706, 1710.

A metric table containing only one metric block is a special case. The tag and size for the table may be omitted and a single metric block may replace the entire table.

A metric block fosters a relationship between logical values specified by a stroke descriptor property (defined below) and some real physical characteristics. The most common values include minimum value, maximum value, precision, and/or units. For example, it may not be known implicitly whether pressure is in pounds, Pascal's or kilograms, or an angle with a value of 10 is in degrees or radians. Without further information an application may assume these values are in the standard normalized form, as defined by the ink object system. This assumption may be error prone. Accordingly, the metric block provides a relationship between values of a stroke and how those values relate to the physical device with which the ink was created.

Typically all strokes in an ink stream will use the same metrics block. An ink stream may have several stroke descriptors, yet still only have one metric block. However, the present system may allow different strokes to refer to different metric blocks in the metric table.

Figure 18:
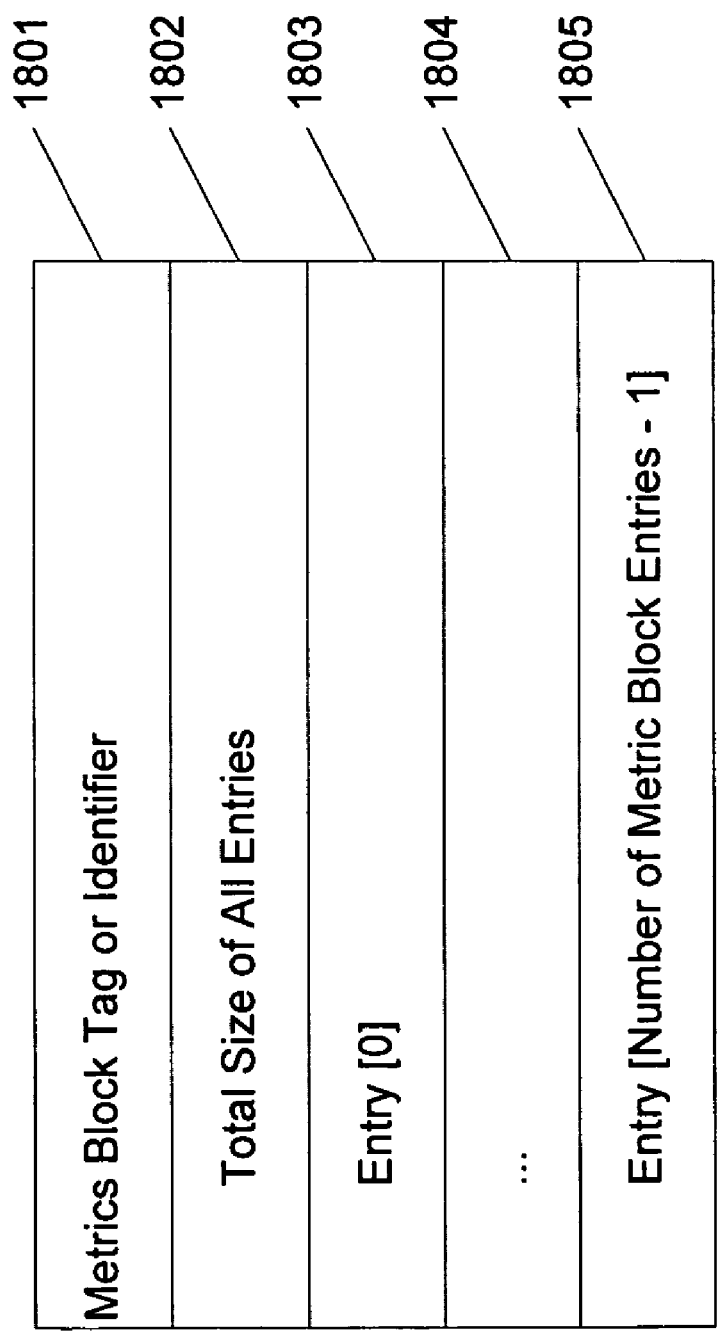
FIG. 18 shows an exemplary data structure showing a metrics block in accordance with embodiments of the present invention.

In FIG. 18, each metric block may start with an identifier 1801 (for example, TAG_METRIC_BLOCK) and is followed by the size 1802 of the block. The TAG_METRIC_BLOCK may be omitted in the metrics table as the table may only contain metric blocks. Next, each entry may follow as entry[0] 1803 -entry[number of metric blocks-1] 1805. The various entries may describe minimum and/or maximum values for values, the degree of precision and associated units, as well as other properties.

The metric block does not necessarily need to define all the packet property tags that are used in the stroke descriptor, since the application may not care about the metrics associated with all the properties or the device may not provide metrics for all the properties. In order to permit the metric block to be easily read in conjunction with the stroke descriptor, the entries in the metric block should be in the same order as found in the stroke descriptor. The metric block differs from the stroke descriptor since it may contain data for X and Y values (for example, identified with TAG_X and TAG_Y). This is because X and Y values may have metrics that need to be stored.

Stroke Description Properties

Figure 19:
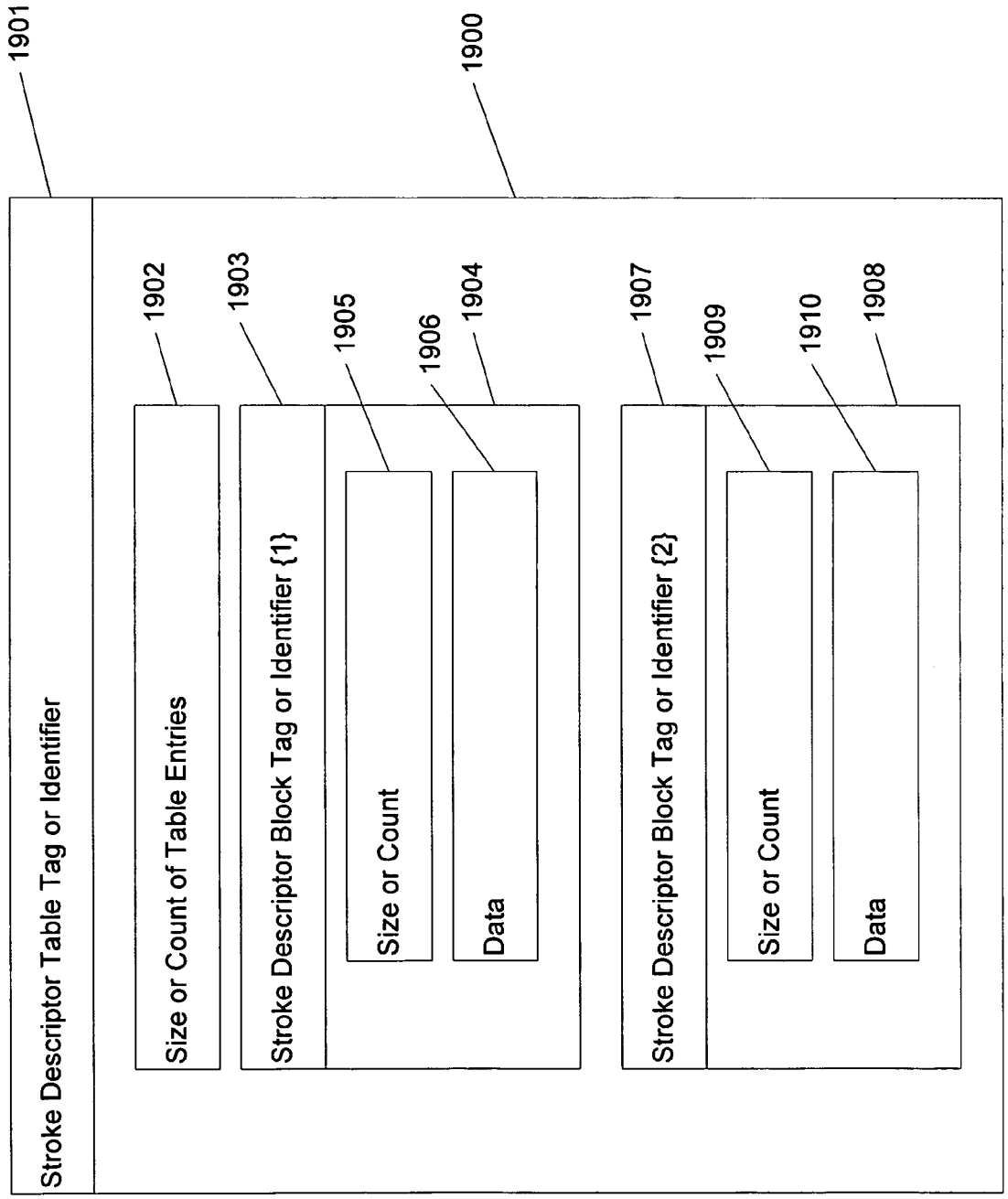
FIG. 19 shows a stroke descriptor table with stroke descriptor blocks in accordance with embodiments of the present invention.

The stroke descriptor table of FIG. 19 lists stroke descriptor blocks in a stream. These blocks may apply to one or more strokes and may be placed in this table so that they are not repeated in each stroke.

An identifier 1901 is used to identify the stroke descriptor table 1900. The tag 1901 may include TAG_STROKE_DESC_TABLE. The size/count 1902 of the table may follow the size of the table. The size of the table may be equal to the sum of the sizes of all stroke descriptor blocks. The count may be the number of blocks 1904, 1908 in the table 1900. Each stroke descriptor block may include an identifier 1903, 1907. Here, the following tag may be used: TAG_STROKE_DESC_BLOCK. Each block 1904, 1908 may include size or count information 1905, 1909 and data 1906, 1910.

The system may have multiple levels of blocks even if there is only one block for a table. On the other hand, a stroke descriptor table containing only one, single level, stroke descriptor block may be considered a special case. In this regard, the tag and size for the table is omitted and a single stroke descriptor block may be used to replace the entire table. In short, a table may contain multiple blocks except when there would only be one block to table. Here, the ink object may only include the stroke descriptor block.

A stroke may contain arrays of data where each array element corresponds to a property of a point. An application may attempt to store other properties, such as pressure. An application may simply create a custom stroke property (described later) to store pressure. Unfortunately, no other application would know how to interpret this data and the tag and size of the custom property would be stored in each stroke, thus wasting space in the data structure. In this event, the stroke descriptor block may be used to solve this problem by defining the data types and their order in the stroke. The system may then use an index to associate a stroke with a particular stroke descriptor block.

Typically, all strokes in an ink stream will use the same stroke descriptor block. However, a stroke descriptor table that contains only one block is rare. However, the system allows different strokes to contain different sets of data by placing the blocks in a table.

Figure 20:
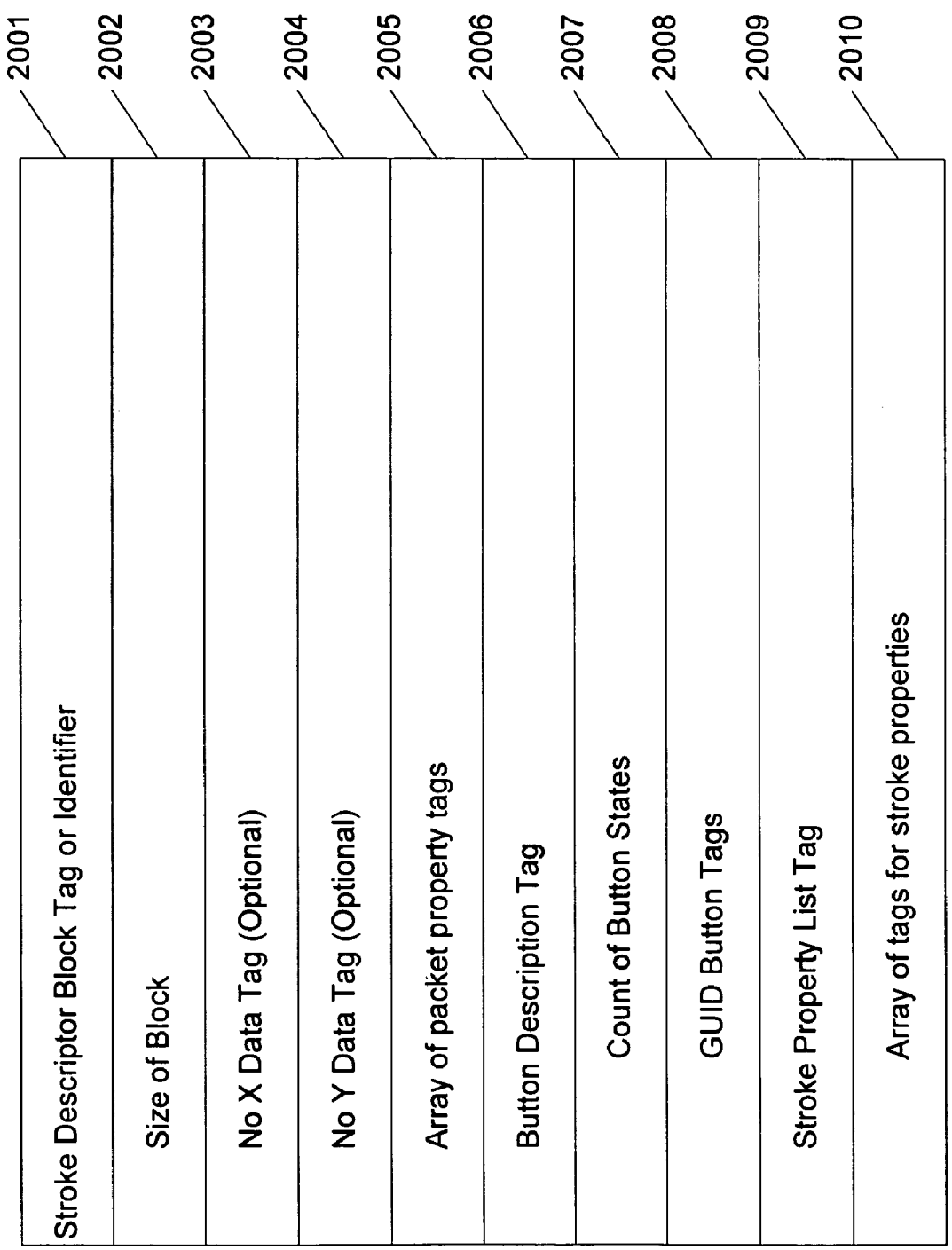
FIG. 20 shows an exemplary stroke descriptor block in accordance with embodiments of the present invention.

FIG. 20 shows an exemplary stroke descriptor block. The stroke descriptor block includes a tag 2001 followed by the size of the block 2002. It is assumed herein that, by default, all strokes will contain X and Y coordinate data arrays and that these will be the first data arrays stored in a stroke. This provides the ability for the stroke to default to looking for X and Y coordinate data (which is more likely than having strokes lack X and Y data). If for some reason the application does not wish to store X and Y coordinates, then it may create a stroke descriptor block containing placeholders to occupy the designated fields for the X and Y coordinate arrays. Here, the placeholders are No X Data Tag 2003 and No Y Data Tag 2004. One may also use TAG_NO_X and TAG_NO_Y values as the two entries. Otherwise the first two arrays in a stroke may be assumed to correspond to the X and Y coordinates.

After the optional TAG_NO_X, TAG_NO_Y placeholders is an array of packet property tags 2005. This array ends when a button identifier or a stroke property identifier is encountered. These may be represented as well as TAG_BUTTONS, TAG_STROKE_PROPERTY_LIST or the end of scope is encountered. Each packet property tag defines another array in the stroke.

Following the packet property array 2005 may be an optional "buttons" section that describes the button bit-fields that make up the elements of the button array in the stroke (e.g. the states of buttons may include bold, underline, shadow and the like). Not all input devices report button states, so this section is optional. If present, the "buttons" section may start with a first button description tag 2006 (e.g., a tag may be TAG_BUTTONS) followed by the count of buttons 2007 (as represented by an identifier, for instance, "cButtons") and an array of button GUID tags 2008 (global unique identifiers), one tag for each button. Note that these tags may be encoded (described later) and the size of the button array may not be an exact multiple of the number of buttons (cButtons). GUIDs are treated in detail in co-pending U.S. Ser. No. 09/852,799, which is incorporated by reference.

If the end of the stroke descriptor block scope has not been reached, then what may follow is a stroke property list. The stroke property list may include identifier 2009 (one may also use TAG_STROKE_PROPERTY_LIST). Following the identifier 2009 is a list of stroke property tags in the array of tags for stroke properties 2010. These tags do not describe arrays of values. Instead they are an optimization that allows a tag that appears repeatedly in strokes to be omitted; only the size and the data need to be specified for the listed property. A stroke may still have additional stroke properties that are not listed in its stroke descriptor block under TAG_STROKE_PROPERTY_LIST. However, these additional properties may have to be listed in the stroke after all the properties listed in the block and they should be tagged explicitly within the stroke.

Finally, various indices may relate the strokes back to the property blocks. Here, based on the above descriptions of the property tables and property blocks, the follow provides the indices that associate the properties with the strokes: a transform index, a metrics index, a drawing attributes index, and a stroke descriptor index.

Transform Index

The transform index (which may be specified with the identifier TAG_TIDX) assigns a transform block to a stroke. A transform index may be followed by an index value that specifies the entry in the transform table. All strokes in the stream from that point on may use the specified transform block until the next transform index is encountered in the stream.

In an alternate embodiment, if there is no transform index in the stream somewhere before the stroke, it may be assumed that this stroke should use the 0th transform block in the transform table. And if there is no transform table in the stream, then no transforms should be applied to any stroke.

Metric Index

The metric index (which may be identified using the tag TAG_MIDX) assigns a metric block to a stroke. The metric index may be followed by an index value that specifies the entry in the metric table. All strokes in the stream from that point onward may use the specified metric block until the next metric index is encountered in the stream.

In an alternate embodiment, if there is no metric index in the stream somewhere before the stroke, this stroke may use the 0th (i.e., first) metric block in the metrics table. If there is only one metric block then the table may be omitted and the 0th metric block is the only metric block in the stream.

Drawing Attribute Index

The drawing attribute index (which may be identified by the tag TAG_DIDX) assigns a drawing attribute block to a stroke. The drawing attribute index may be followed by an index value that specifies the entry in the drawing attributes table. All strokes in the stream from that point on may use the specified drawing attribute block until the next drawing attribute index is encountered in the stream.

In an alternative embodiment, if there is no drawing attribute index in the stream somewhere before the stroke, it may be assumed that this stroke should use the 0th (i.e., first) drawing attribute block in the drawing attributes table. And if there is no drawing attributes table in the stream, then all strokes may be drawn using the default set of drawing attributes.

Stroke Descriptor Index

A stroke descriptor index (which may be identified using a tag as TAG_SIDX) assigns a stroke descriptor block to a stroke. A stroke descriptor index may be followed by an index value that specifies the entry in the stroke descriptor table. All strokes in the stream from that point on may use the specified stroke descriptor block until the next stroke descriptor index is encountered in the stream.

In an alternate embodiment, if there is no stroke descriptor index in the stream somewhere before the stroke, it may be assumed that this stroke should use the 0th Stroke descriptor block in the stroke descriptor table. And if there is no stroke descriptor table in the stream, then all strokes may be assumed to contain X and Y coordinates only.

Encoding of Values

The serial nature of the ink object leads to efficient storage. In the above examples, X and Y data may be compressed. A number of encoding strategies and compression methods may be used alone or in combination.

Sizes of Tags and Numbers

At the most basic level, the ink object may be composed of numbers. Even tags may be considered indexes, which are just small integer numbers. In fact, most of the time these numbers are small enough that they could be represented by a single byte if there was a way of determining when a byte represented a single number and when it was just part of a bigger number. In some embodiments, no encoding is used. In other embodiments, it may be possible to take advantage of this observation by encoding numbers using a multi-byte encoding technique.

Multi-byte encoding makes it possible to represent small numbers in one byte, larger numbers in two bytes and very large numbers in however many bytes are necessary. This means that tags, which usually have a value less than 100, are stored as a single byte and sizes, which may be small or large, are stored in the most efficient manner. In effect, multi-byte encoding may be a compression technique.

Various types of multi-byte encoding are known. An example of multi-byte encoding is shown and works as follows:

a. Numbers less than 128 are encoded in one byte.
b. The most significant bit remains in the byte clear.
c. Multi-byte encoding interprets the most significant bit being clear to mean this may be the last byte in a number.
d. Numbers larger than 128 are broken up into 7 bit segments.
e. The 7 bit segments are then each stored in a byte.
f. And the most significant bit in each byte except the last may be set.

In other words, the system handles information such that:

a. Numbers less than $2^7=128$ are encoded in a single byte.
b. Numbers less than $2^{14}=16384$ are encoded in two bytes.
c. Numbers less than $2^{21}=2097152$ are encoded in three bytes.
d. Etc.

In general, bytes are processed until a byte with the most significant bit clear may be encountered. For example, the first number encountered may be the ink object identifier number. For version 1.0 this value may be "0" and can be encoded in a single byte. The next number may be the size of the stream following the size value, and for small ink objects as in the first example this will also be encoded in a single byte. However, if the stream may be long this value can grow as large as necessary. For example, a multi-byte encoded number of 10 bytes can represent a 64-bit number.

This same process may be applied to "tags" and other values in the stream. In general since "tags" are small integer indexes, they too may be one byte encoded.

Multi-Byte Encoding of Signed Numbers

Multi-byte encoding as described above works well for positive integers. However, in some cases it may be necessary to store signed numbers. For example, the coordinates of a point may be positive or negative depending on where the application situates the origin.

To multi-byte encode a signed number, the absolute value of the signed number may be determined, the absolute value then may be shifted left by 1 bit, and the sign of the original number may be stored in the list significant bit.

Using the technique set forth above, the signed numbers with absolute values are handled as follows:

a. Numbers less than $2^6=64$ are encoded in one byte,
b. Numbers less than $2^{13}=8192$ are encoded in 2 bytes
c. etc.

Reading and Writing Properties

Figure 21:
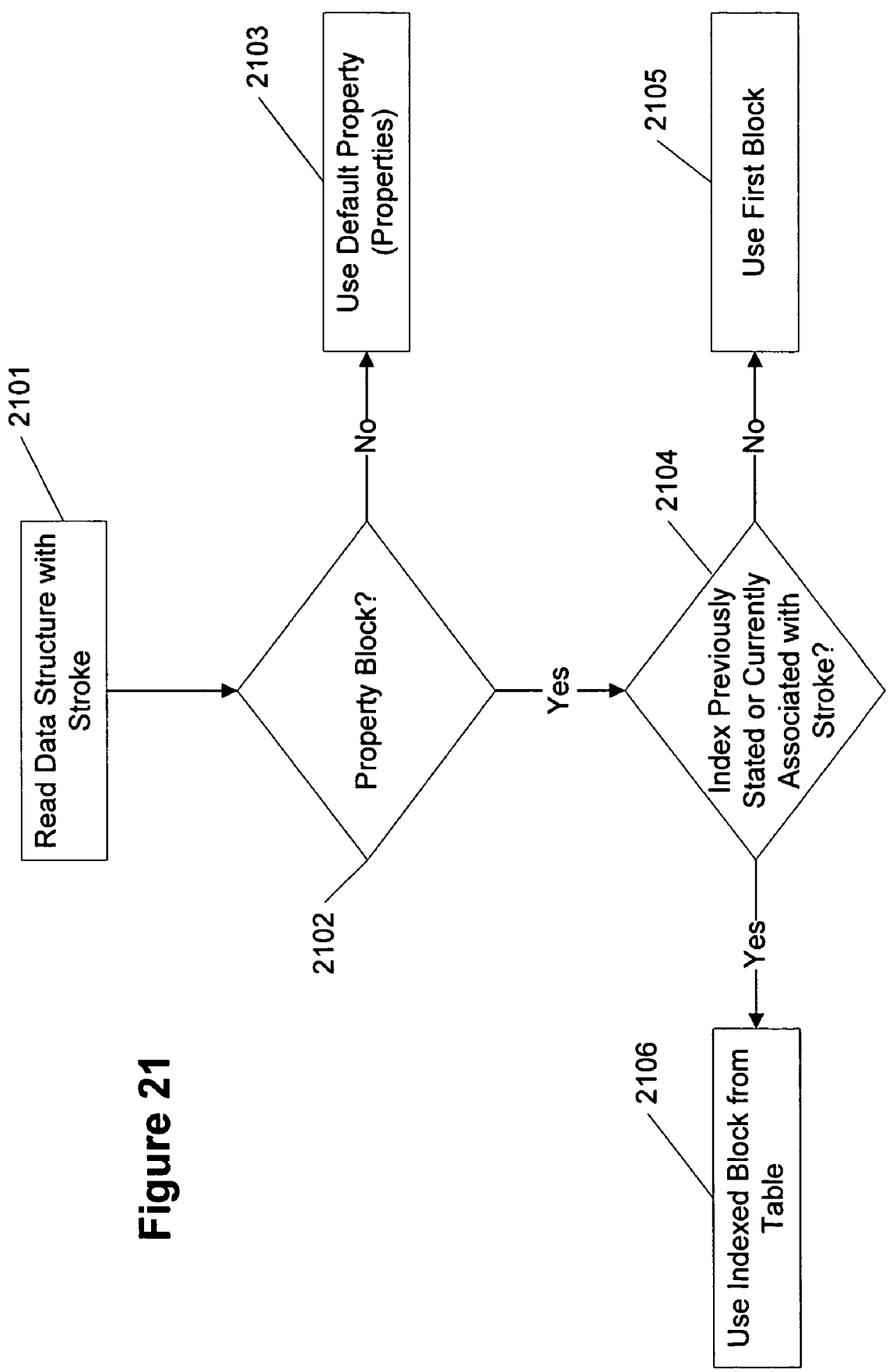
FIG. 21 shows a method for reading a data structure in accordance with embodiments of the present invention.

FIG. 21 shows a method for reading properties. In step 2101, the system reads the data structure that contains a stroke. In step 2102, the system determines whether a property block has been read. If no, then the system uses the default property (or properties) in step 2103. If a property block has been read in step 2102, the system determines whether an index has been previously stated or currently associated with the stroke in step 2104. If no, then the system uses the first property block in step 2105. If an index was stated or is currently associated with a stroke, then the system uses the block from the property table referenced by the index in step 2106.

Various modifications of this method exist. For example, there may always be indices associated with strokes. So, because the answer of determination step 2104 would always be yes, step 2105 may be eliminated. Also, there may always be property blocks associated with strokes. If so, the determination of step 2102 would always be yes, so the use of a default property in 2103 would never occur. Other modifications may be made as well.

Figure 22:
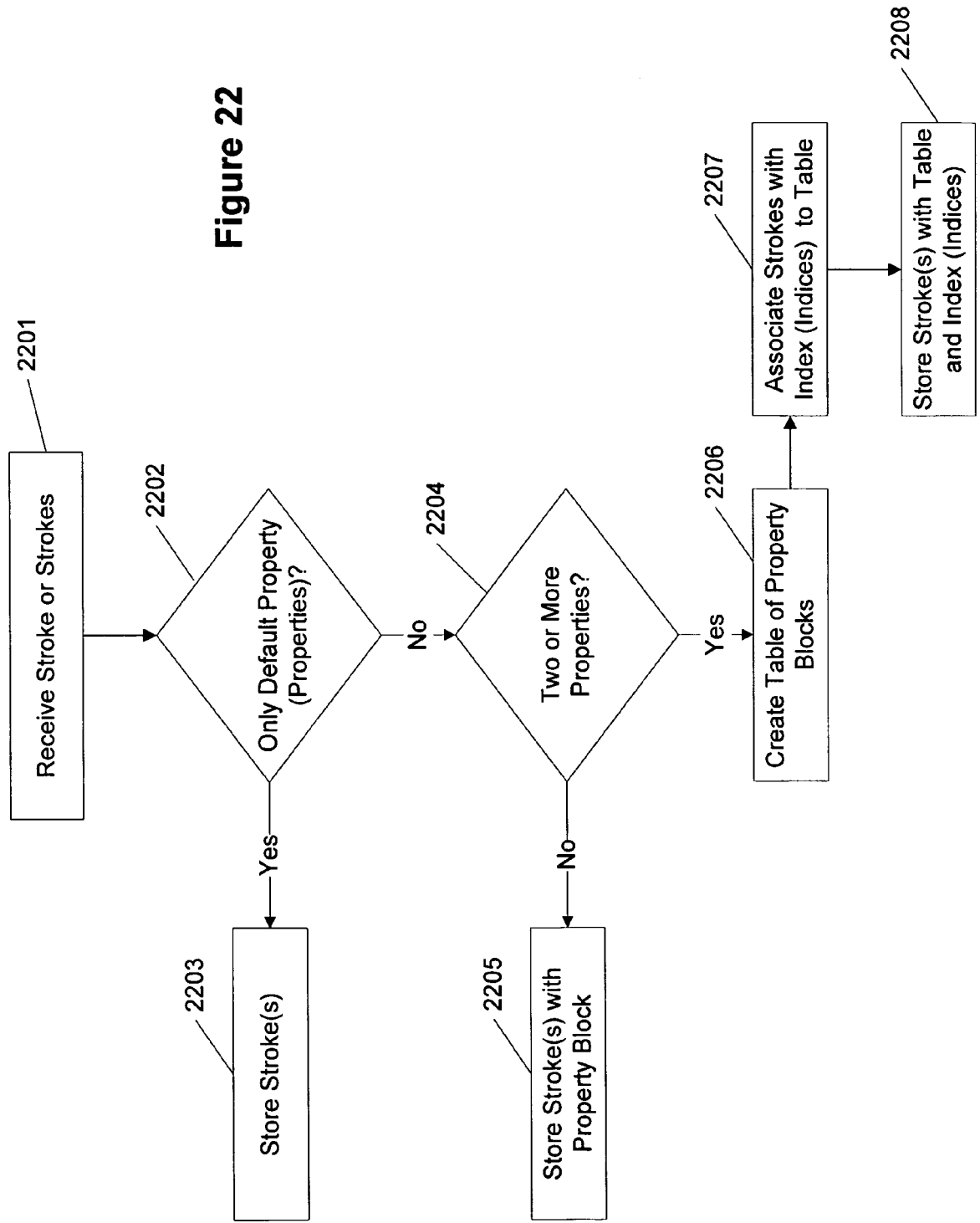
FIG. 22 shows a method of creating a data structure in accordance with embodiments of the present invention.

FIG. 22 shows a process for organizing strokes into a serialized format. In step 2201, the system receives a stroke or strokes. In step 2202, the system determines whether only default property or properties exist for the stroke or strokes. If so, the stroke or strokes are stored in step 2203. If there is a non-default property, then the system determines whether there are two or more properties in step 2204. If no, the system stores the stroke or strokes with the property block in step 2205. If there are two or more properties as determined in step 2204, the system creates a table of property blocks in step 2206, associates strokes with an index or indices to the table in step 2207, and stores the stroke or strokes with the table having blocks and index (or indices) in step 2208.

Other modifications exist. For example, there may be no default properties. In this case, step 2203 and 2202 may be eliminated. Also, each stroke may have its own property block. Thereby making step 2204 redundant and permitting its elimination (and that of steps 2206–2208).

A Summarization of the Storage of Ink

Ink may be stored in an ink object with the ink object providing coordinate data and/or other properties associated with strokes. Compression may be used to increase the efficiency at which the ink may be stored.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

We claim:

1. A computer readable medium having a data structure thereon for storing an ink object, said data structure comprising:
   a first portion having a table, said table having blocks storing properties; and
   a second portion having a plurality of ink-stroke items, said ink-stroke items each having a respective index that references one of said blocks such that there are fewer indexes with unique values than ink-stroke items in the second portion of the data structure wherein the second portion of the data structure includes at least one ink-stroke item that uses and index of preceding ink-stroke item in the event that the at least one ink-stroke item does not have an index.

2. The computer readable medium according to claim 1, wherein said object is a text object or a graphical object.

3. The computer readable medium according to claim 1, wherein said blocks have entries, said entries having at least one property.

4. The computer readable medium according to claim 1, wherein the second portion of the data structure includes at least one ink-stroke item having a predetermined index that references a default property block.

5. The computer readable medium according to claim 1, wherein the second portion of the data structure includes at least one ink-stroke item that references a default property block by not having an index.

6. The computer readable medium according to claim 1, wherein the properties include transformation properties.

7. The computer readable medium according to claim 1, wherein the properties include drawing-attribute properties.

8. The computer readable medium according to claim 1, wherein the properties include metrics properties.

9. The computer readable medium according to claim 1, wherein the properties include stroke-description properties.

10. A method for creating a data structure for storing ink comprising the steps of:
    receiving a plurality of strokes;
    creating a table having a plurality of property blocks; and
    associating with said plurality of strokes a plurality of indexes each of which references a property block of the plurality of property blocks such that there are fewer indexes with unique values than associated strokes wherein the plurality of strokes includes at least one stroke that uses an index of a preceding stroke in the event that the at least one stroke does not have an index.

* * * * *